(12) United States Patent
Tominaga et al.

(10) Patent No.: US 9,002,614 B2
(45) Date of Patent: Apr. 7, 2015

(54) INTER-VEHICLE DISTANCE CONTROL DEVICE

(71) Applicants: Denso Corporation, Kariya, Aichi-pref. (JP); Nippon Soken, Inc., Nishio, Aichi-pref. (JP)

(72) Inventors: Motonori Tominaga, Anjo (JP); Tomohiko Tsuruta, Aichi-ken (JP); Yusuke Ueda, Nishio (JP); Takeshi Hatoh, Nagoya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 13/775,826

(22) Filed: Feb. 25, 2013

(65) Prior Publication Data

US 2013/0226433 A1  Aug. 29, 2013

(30) Foreign Application Priority Data

Feb. 28, 2012  (JP) ................. 2012-041822

(51) Int. Cl.
*B60T 7/12* (2006.01)
*G05D 1/00* (2006.01)
*G05D 1/12* (2006.01)
*G06F 7/00* (2006.01)
(Continued)

(52) U.S. Cl.
CPC ........ *B60K 31/0008* (2013.01); *B60W 50/0097* (2013.01); *B60W 30/16* (2013.01); *B60W 30/18163* (2013.01); *B60W 2750/308* (2013.01); *Y02T 10/84* (2013.01)

(58) Field of Classification Search
CPC ............. G01S 13/931; G01S 13/9321; G01S 13/9325; G01S 13/9332; G01S 13/72; G01S 13/726; G01C 3/00; B60R 2300/80; B60R 2300/8066; B60R 2300/804; B60R 2300/802; G08G 1/16; G08G 1/161–1/163; B60K 31/0008; B60K 2031/0016; B60K 2031/0025; B60K 2031/005
USPC .................... 701/301, 96; 340/435–436, 903
See application file for complete search history.

(56) References Cited

U.S. PATENT DOCUMENTS 5,618,993 A * 4/1997 Matsumoto et al. ............ 73/587
5,754,099 A * 5/1998 Nishimura et al. ........... 340/435
(Continued)

FOREIGN PATENT DOCUMENTS

JP        4771602         7/2011
JP      2011221654 A  * 11/2011

*Primary Examiner* — John R Olszewski
*Assistant Examiner* — Tommy Worden
(74) *Attorney, Agent, or Firm* — Harness, Dickey & Pierce, PLC

(57) ABSTRACT

An inter-vehicle distance control device is provided. In this control device, an inter-vehicle distance detecting section detects an inter-vehicle distance between an own vehicle and a preceding vehicle traveling in front of the own vehicle. A laterally adjacent vehicle detecting section detects another vehicle present beside the own vehicle. A cut-in detecting section judges whether or not a cut-in by the other vehicle detected by the laterally adjacent vehicle detecting section is likely to occur, before the other vehicle cuts in between the own vehicle and the preceding vehicle. An inter-vehicle distance adjusting section performs an inter-vehicle distance extension adjustment to increase the inter-vehicle distance when the cut-in detecting section judges that a cut-in is likely to occur. An inter-vehicle distance control section controls the inter-vehicle distance based on information from the inter-vehicle distance adjusting section.

21 Claims, 21 Drawing Sheets

(51) Int. Cl.
  *G06F 17/00* (2006.01)
  *B60K 31/00* (2006.01)
  *B60W 50/00* (2006.01)
  *B60W 30/16* (2012.01)
  *B60W 30/18* (2012.01)

(56) References Cited

U.S. PATENT DOCUMENTS

| | | | |
|---|---|---|---|
| 6,223,117 B1 * | 4/2001 | Labuhn et al. | 701/93 |
| 6,353,788 B1 * | 3/2002 | Baker et al. | 701/96 |
| 6,560,525 B1 * | 5/2003 | Joyce et al. | 701/96 |
| 6,636,148 B2 * | 10/2003 | Higuchi | 340/436 |
| 6,664,920 B1 * | 12/2003 | Mott et al. | 342/129 |
| 6,670,910 B2 * | 12/2003 | Delcheccolo et al. | 342/70 |
| 6,679,702 B1 * | 1/2004 | Rau | 434/29 |
| 6,708,099 B2 * | 3/2004 | Tellis et al. | 701/96 |
| 6,744,380 B2 * | 6/2004 | Imanishi et al. | 340/937 |
| 7,102,496 B1 * | 9/2006 | Ernst et al. | 340/436 |
| 7,124,010 B2 * | 10/2006 | Egami | 701/93 |
| 7,124,027 B1 * | 10/2006 | Ernst et al. | 701/301 |
| 7,234,786 B2 * | 6/2007 | Mori et al. | 303/191 |
| 7,444,241 B2 * | 10/2008 | Grimm | 701/301 |
| 7,753,153 B2 * | 7/2010 | Swoboda et al. | 180/170 |
| 7,835,861 B2 * | 11/2010 | Emoto et al. | 701/436 |
| 7,920,966 B2 * | 4/2011 | Emoto et al. | 701/436 |
| 7,974,781 B2 * | 7/2011 | Emoto et al. | 701/436 |
| 8,000,874 B2 * | 8/2011 | Tange et al. | 701/96 |
| 8,116,929 B2 * | 2/2012 | Higgins-Luthman | 701/28 |
| 8,417,022 B2 * | 4/2013 | Morimitsu | 382/154 |
| 2002/0147534 A1 * | 10/2002 | Delcheccolo et al. | 701/45 |
| 2003/0069695 A1 * | 4/2003 | Imanishi et al. | 701/301 |
| 2003/0163240 A1 * | 8/2003 | Egami | 701/96 |
| 2003/0233187 A1 * | 12/2003 | Egami | 701/96 |
| 2005/0206236 A1 * | 9/2005 | Mori et al. | 303/175 |
| 2006/0140449 A1 * | 6/2006 | Otsuka et al. | 382/104 |
| 2007/0150196 A1 * | 6/2007 | Grimm | 701/301 |
| 2008/0033642 A1 * | 2/2008 | Emoto et al. | 701/209 |
| 2008/0040035 A1 * | 2/2008 | Emoto et al. | 701/211 |
| 2008/0162043 A1 * | 7/2008 | Emoto et al. | 701/211 |
| 2008/0243351 A1 * | 10/2008 | Isogai et al. | 701/96 |
| 2009/0046924 A1 * | 2/2009 | Morimitsu | 382/154 |
| 2010/0253595 A1 * | 10/2010 | Szczerba et al. | 345/7 |
| 2011/0285573 A1 * | 11/2011 | Jeong | 342/70 |
| 2012/0008129 A1 * | 1/2012 | Lu et al. | 356/5.01 |

* cited by examiner

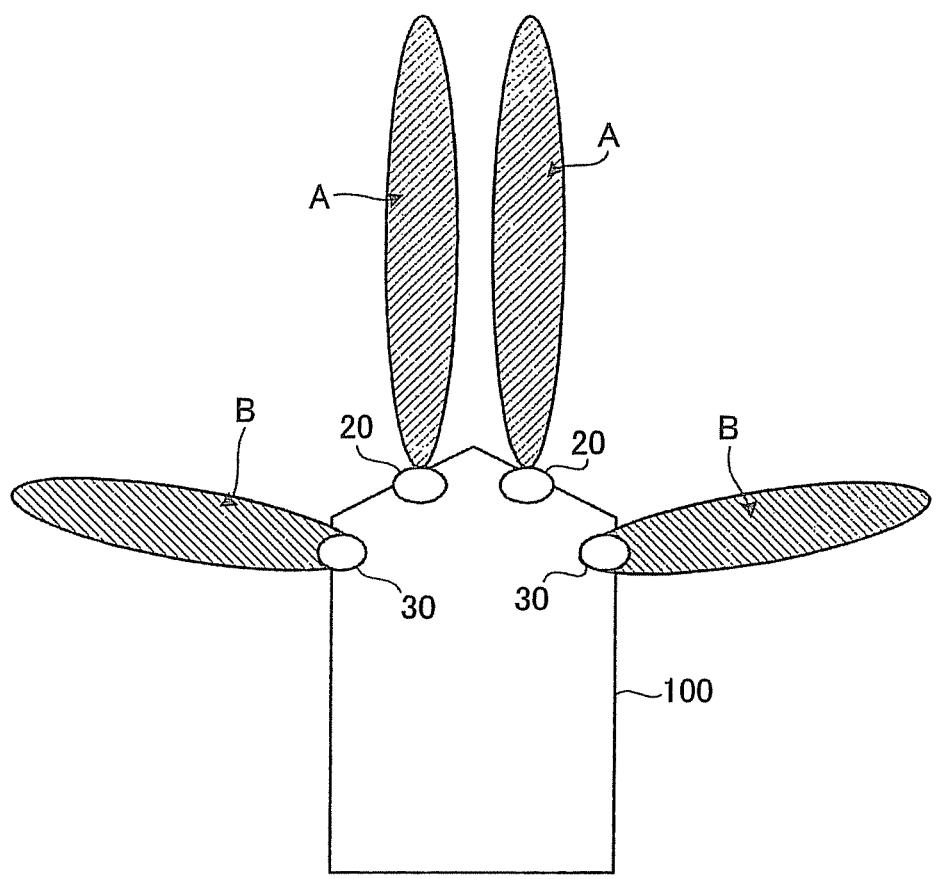

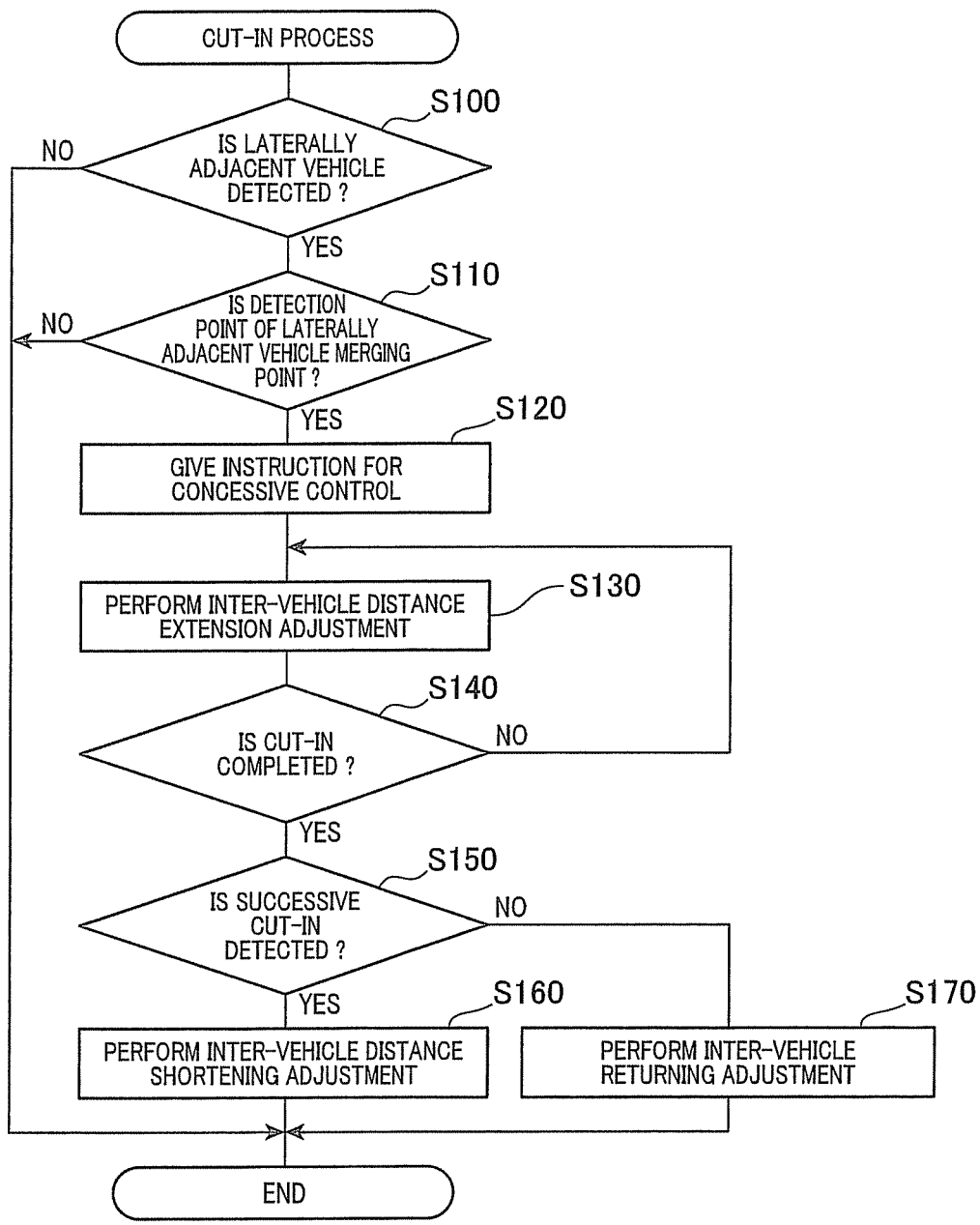

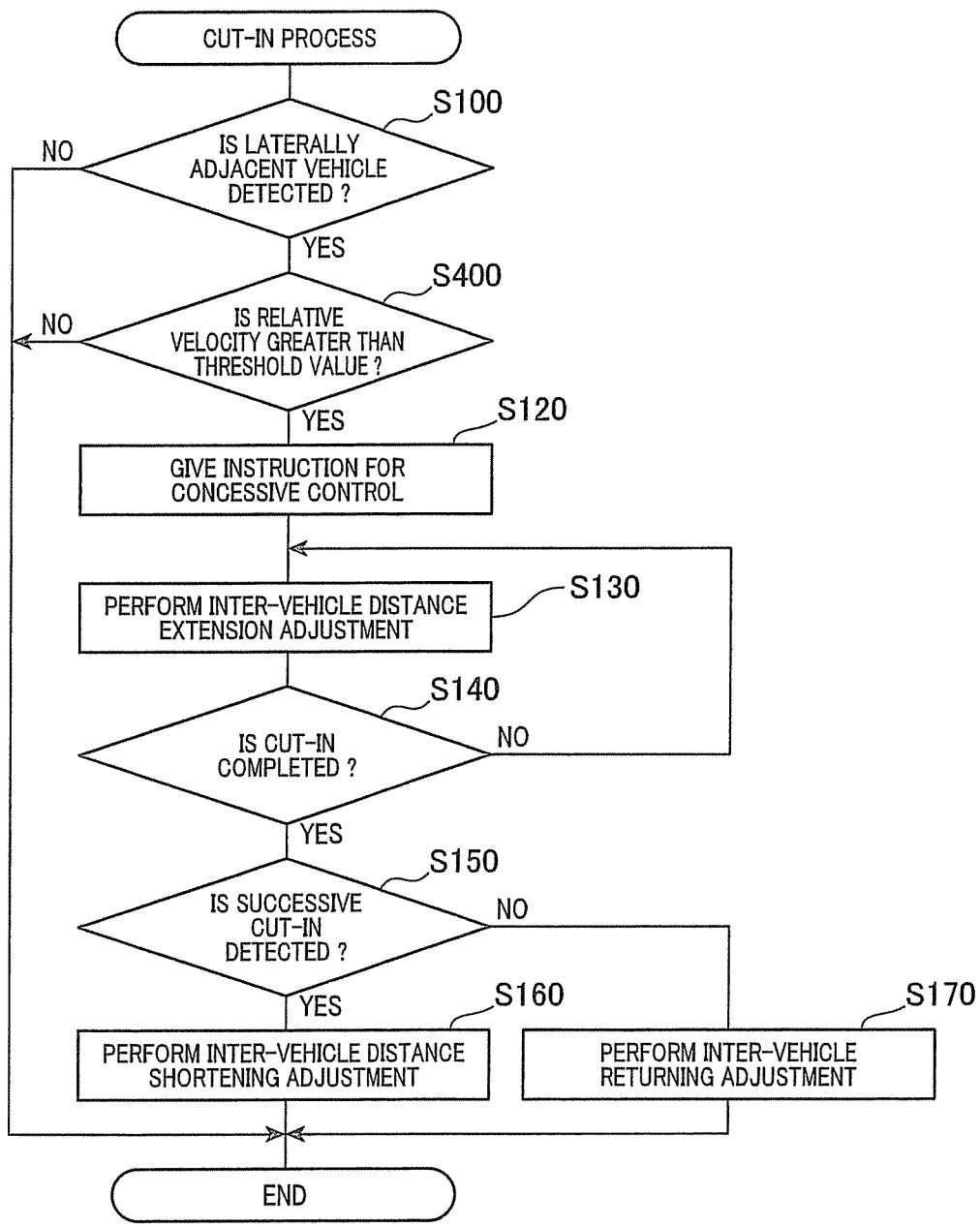

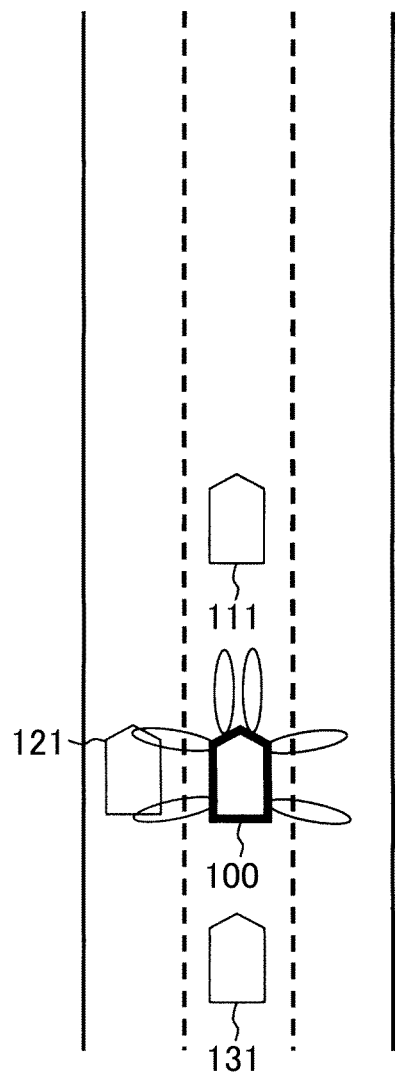 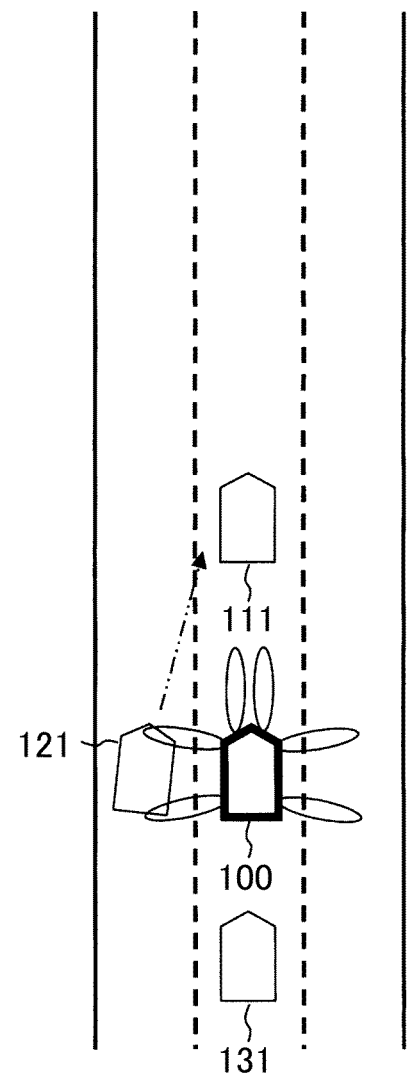

INTER-VEHICLE DISTANCE CONTROL DEVICE

CROSS-REFERENCE TO RELATED APPLICATION

This application is based on and claims the benefit of priority from earlier Japanese Patent Application No. 2012-41822 filed Feb. 28, 2012, the description of which is incorporated herein by reference.

BACKGROUND OF THE INVENTION

1. Field of the Invention

The present invention relates to an inter-vehicle distance control device that controls the speed and the like of a vehicle in which the inter-vehicle distance control device is mounted (hereinafter referred to as an "own vehicle"), such that the inter-vehicle distance between the own vehicle and a leading vehicle in front of the own vehicle is a distance set in advance.

2. Description of the Related Art

Conventionally, inter-vehicle distance control devices have been known that detect the inter-vehicle distance between the own vehicle and a leading vehicle, and control speed to maintain an inter-vehicle distance set in advance (set inter-vehicle distance). Among such inter-vehicle distance control devices, for example, Japanese registered patent JP-4771602-B discloses a technology in which, when another vehicle cuts in between the own vehicle and the leading vehicle, the inter-vehicle distance between the own vehicle and the other vehicle is temporarily set to a predetermined target inter-vehicle distance that is shorter than the set inter-vehicle distance, and speed control is performed. The inter-vehicle distance is subsequently returned to the set inter-vehicle distance in stages, based on the amount of surrounding traffic.

In the above-described inter-vehicle distance control device, when another vehicle cuts in in front of the own vehicle, the inter-vehicle distance between the own vehicle and the leading vehicle becomes shortened. Therefore, there is an advantage in that other vehicle is unlikely to be able to cut in during heavy traffic.

However, in the conventional technology, inter-vehicle distance control is started once the other vehicle cuts in between the own vehicle and the leading vehicle. Therefore, inter-vehicle distance control for the other vehicle is delayed, possibly causing the drivers of both the own vehicle and the other vehicle to experience unease.

Therefore, an inter-vehicle distance control device is desired that reduces unease experienced by the drivers of both the own vehicle and another vehicle, in a situation in which the other vehicle cuts in between a preceding vehicle that is the leading vehicle and the own vehicle.

SUMMARY

As a typical example, the present application provides an inter-vehicle distance control device including: an inter-vehicle distance detecting means for detecting an inter-vehicle distance between an own vehicle and a preceding vehicle traveling in front of the own vehicle; a laterally adjacent vehicle detecting means for detecting another vehicle present beside the own vehicle; a cut-in detecting means for judging whether or not a cut-in by the other vehicle detected by the laterally adjacent vehicle detecting means is likely to occur, before the other vehicle cuts in between the own vehicle and the preceding vehicle; an inter-vehicle distance adjusting means for performing inter-vehicle distance extension adjustment to increase the inter-vehicle distance when the cut-in detecting means judges that another vehicle is likely to cut-in in front of the own vehicle; and an inter-vehicle distance control means for controlling the inter-vehicle distance based on information from the inter-vehicle distance adjusting means (14).

Here, the inter-vehicle distance detecting means detects the inter-vehicle distance between the own vehicle and the preceding vehicle in front of the own vehicle. The laterally adjacent vehicle detecting means detects another vehicle present beside the own vehicle. At this time, the cut-in detecting means judges whether or not the other vehicle detected by the laterally adjacent vehicle detecting means (is likely to cut-in, before the other vehicle cuts in between the own vehicle and the preceding vehicle. When judged that the other vehicle is likely to cut-in, the inter-vehicle distance adjusting means performs the inter-vehicle distance extension adjustment to increase the inter-vehicle distance. The inter-vehicle distance control means controls the inter-vehicle distance based on information from the inter-vehicle distance adjusting means.

As a result of this configuration, adjustment is made to increase the distance between the own vehicle and the preceding vehicle when a laterally adjacent vehicle is judged likely to cut-in in front of the own vehicle, rather than when the cut-in in front of the own vehicle occurs. Therefore, distance control between the own vehicle and the other vehicle is not delayed. Situations in which the drivers of both the own vehicle and the other vehicle experience unease are reduced.

BRIEF DESCRIPTION OF THE DRAWINGS

FIG. 2 is an explanatory diagram of the placement of each detecting section and detection areas of the detecting sections;

FIG. 3 is a flowchart of a cut-in process according to the first embodiment;

FIG. 13 is a flowchart of a cut-in process according to the fourth embodiment;

FIG. 14A and FIG. 14B are explanatory diagrams of specific examples of a cut-in according to the fourth embodiment;

DETAILED DESCRIPTION OF THE PREFERRED EMBODIMENTS

Embodiments of the present invention will hereinafter be described with reference to the drawings.

First Embodiment

Figure 1:
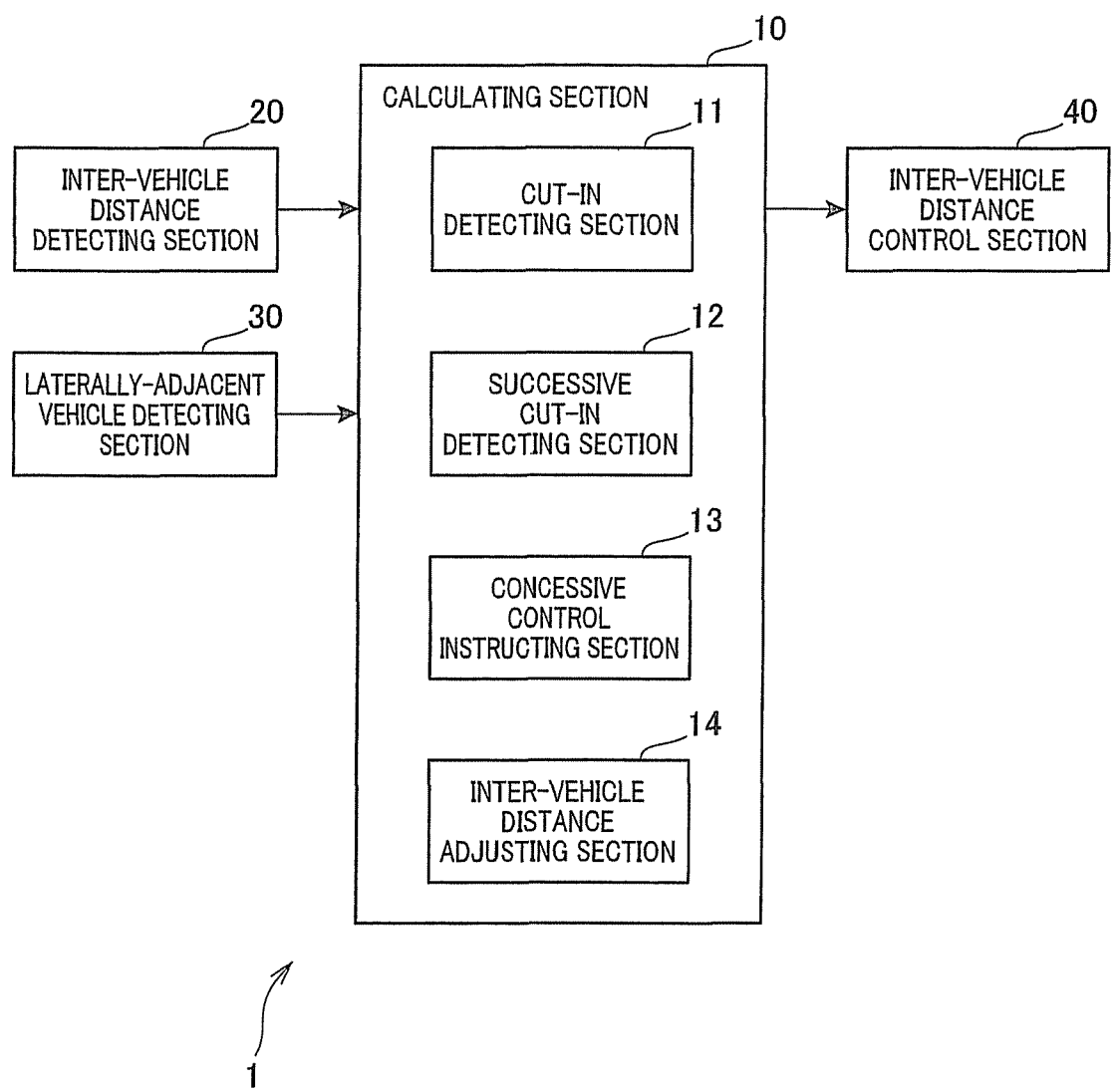
FIG. 1 is a block diagram of an overall configuration of an inter-vehicle distance control device according to a first embodiment.

As shown in FIG. 1, an inter-vehicle distance control device 1 according to a first embodiment is configured with a calculating section 10 as a main component. The calculating section 10 is realized as a computer including a central processing unit (CPU), a read-only memory (ROM), a random access memory (RAM), an input/output (I/O) interface, a bus line connecting these components, and the like. Inter-vehicle distance detecting sections 20, laterally-adjacent vehicle detecting sections 30, and an inter-vehicle distance control section 40 are connected to the calculating section 10.

The inter-vehicle distance detecting section 20 detects the inter-vehicle distance between the own vehicle and a leading vehicle. The inter-vehicle distance detecting section 20 is realized as a millimeter-wave radar, a laser radar, or the like. The inter-vehicle distance detecting sections 20 are, for example, placed in bilateral symmetry in the front section of an own vehicle 100, as shown in FIG. 2. The detection areas of the inter-vehicle distance detecting sections 20 in this instance are, for example, as indicated by symbol A.

The laterally-adjacent vehicle detecting section 30 detects another vehicle traveling beside the own vehicle. The laterally-adjacent vehicle detecting section 30 is realized as a sonar, a millimeter-wave radar, a laser radar, a camera, or the like. The laterally-adjacent vehicle detecting sections 30 are placed on the left-side section and right-side section of the own vehicle 100, as shown in FIG. 2. The detection areas of the laterally-adjacent vehicle detecting sections 30 in this instance are, for example, as indicated by symbol B.

The inter-vehicle distance control section 40 controls speed to achieve a target inter-vehicle distance outputted from the calculating section 10. For example, the inter-vehicle distance control section 40 performs acceleration control based on the difference between an actual inter-vehicle distance and the target inter-vehicle distance. The actual inter-vehicle distance is inputted from the inter-vehicle distance detecting section 20 to the calculating section 10.

Next, functions of the calculating section 10 will be described.

The calculating section 10 has a cut-in detecting section 11, a successive cut-in detecting section 12, a concessive control instructing section 13, and an inter-vehicle distance adjusting section 14 as functional blocks, as shown in FIG. 1.

The cut-in detecting section 11 detects whether or not another vehicle that is likely to cut in front of the own vehicle is present, based on information from the laterally-adjacent vehicle detecting section 30 and information from a global positioning system (GPS) receiver or the like (not shown).

Immediately after inter-vehicle distance control is performed after the cut-in detecting section 11 detects the cut-in by the other vehicle, the successive cut-in detecting section 12 detects another vehicle that is likely to cut in front of the own vehicle.

The concessive control instructing section 13 instructs the inter-vehicle distance adjusting section 14 to perform control for conceding to the other vehicle (hereinafter referred to as "concessive control") when the cut-in detecting section 11 detects the cut-in by the other vehicle in front of the own vehicle.

The inter-vehicle distance adjusting section 14 performs adjustment to extend the inter-vehicle distance when an instruction is received from the concessive control instructing section 13. The inter-vehicle distance adjusting section 14 also adjusts the inter-vehicle distance after the cut-in by the other vehicle is completed.

Next, a process performed by the calculating section 10 when a cut-in occurs (hereinafter referred to as a "cut-in process") will be described based on the flowchart in FIG. 3. The cut-in process is repeatedly performed at a predetermined time interval by the calculating section 10.

At the first S100, the calculating section 10 judges whether or not a laterally adjacent vehicle is detected. This processing operation is performed to judge whether or not another vehicle is present beside the own vehicle, based on information from the laterally-adjacent vehicle detecting section 30. When judged that a laterally adjacent vehicle is detected (YES at S100), the calculating section 10 proceeds to S110. On the other hand, when judged that a laterally adjacent vehicle is not detected (NO at S100), the calculating section 10 does not perform subsequent processing operations and ends the cut-in process. In this instance, the calculating section 10 repeats the process from S100.

At S110, the calculating section 10 judges whether or not the point at which the laterally adjacent vehicle is detected is a meeting point of more than two vehicles (hereinafter referred to as merely "meeting point"). This processing operation is performed based on information from a GPS receiver or the like (not shown). The processing operation is performed to judge whether or not the laterally adjacent vehicle detected at S100 is a vehicle that is attempting to merge into the cruising lane in which the own vehicle is traveling (hereinafter referred to as an "own lane"). Therefore, when judged at S100 that the other vehicle is detected on the left side of the own vehicle facing the traveling direction, the calculating section 10 judges at S110 whether or not this point is a point at which merging from the left side occurs. When judged that this point is a meeting point (YES at S110), the calculating section 10 proceeds to S120. On the other hand, when judged that this point is not at a meeting point (NO at S110), the calculating section 10 does not perform subsequent processing operations and ends the cut-in process.

The processing operations at S100 and S110 are actualized as functions of the cut-in detecting section At S120, the calculating section 10 gives an instruction for concessive control. This processing operation is actualized as a function of the concessive control instructing section 13.

The processing operation is performed to instruct the inter-vehicle distance adjusting section 14 to start concessive control.

At subsequent S130, the calculating section 10 performs inter-vehicle distance extension adjustment. This processing operation is performed to adjust the target inter-vehicle distance to be longer than the current inter-vehicle distance when the instruction for concessive control is given at S120. The processing operation is actualized as a function of the inter-vehicle distance adjusting section 14. Specifically, the difference between the target inter-vehicle distance and the actual inter-vehicle distance from the inter-vehicle distance detecting section 20 increases as a result of the inter-vehicle distance adjusting section 14 increasing the target inter-vehicle distance. Therefore, the inter-vehicle distance control section 40 performs deceleration control. In other words, control to increase the inter-vehicle distance is performed when the laterally adjacent vehicle attempting to cut in front of the own vehicle is detected.

Next, at S140, the calculating section 10 judges whether or not the cut-in is completed. This processing operation is performed to judge whether or not the laterally adjacent vehicle has cut in front of the own vehicle and become the leading vehicle in relation to the own vehicle. Here, when judged that the cut-in is completed (YES at S140), the calculating section 10 proceeds to S150. On the other hand, when judged that the cut-in is not yet completed (NO at S140), the calculating section 10 repeats the process from S130.

At S150, the calculating section 10 detects a successive cut-in. This processing operation is performed to judge whether or not a laterally adjacent vehicle other than the other vehicle that has cut into the own lane is present. The processing operation is actualized as a function of the successive cut-in detecting section 12. When judged that a successive cut-in is detected (YES at S150), the calculating section 10 performs inter-vehicle distance shortening adjustment at S160 and then ends the cut-in process. The inter-vehicle distance shortening adjustment at S160 is performed to set the target inter-vehicle distance to a short distance to inhibit cut-in by another vehicle after the inter-vehicle distance extension adjustment has been performed. The inter-vehicle distance shortening adjustment is actualized as a function of the inter-vehicle distance adjusting section 14. Specifically, the inter-vehicle distance adjusting section 14 sets the target inter-vehicle distance to a short distance. As a result, the inter-vehicle distance control section 40 performs acceleration control. In other words, control to shorten the inter-vehicle distance is performed when a laterally adjacent vehicle attempting to cut in front of the own vehicle is detected. On the other hand, when judged that a successive cut-in is not detected (NO at S150), the calculating section 10 performs inter-vehicle distance returning adjustment at S170 and then ends the cut-in process. The inter-vehicle distance returning adjustment at S170 is performed to return the target inter-vehicle distance to the inter-vehicle distance set in advance, after the inter-vehicle distance extension adjustment has been performed. The inter-vehicle distance returning adjustment is actualized as a function of the inter-vehicle distance adjusting section 14. Specifically, the inter-vehicle distance adjusting section 14 returns the target inter-vehicle distance to the set inter-vehicle distance. As a result, control is performed such as to maintain the set inter-vehicle distance.

Figure 4A:
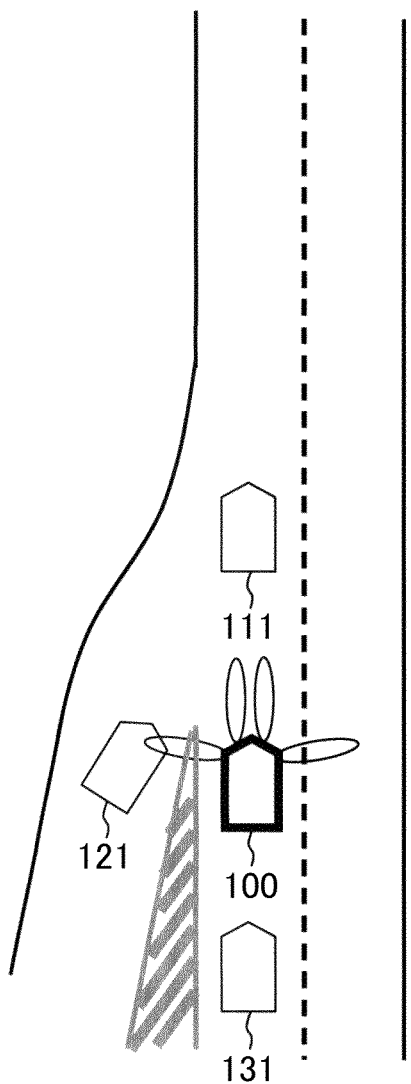
FIG. 4A and FIG. 4B are explanatory diagrams of specific examples of a cut-in according to the first embodiment.

In the cut-in process such as that described above, when an other vehicle that is a laterally adjacent vehicle 121 is detected beside an own vehicle 100 (YES at S100 in FIG. 3) as shown in FIG. 4A, the calculating section 10 judges whether or not the point at which the other vehicle is detected is a meeting point (S110). When judged that the point is a meeting point (YES at S110), the calculating section 10 judges that the likelihood of a cut-in is high and gives an instruction for concessive control (S120). When judged that the cut-in is not yet completed (NO at S140), the calculating section 10 performs the inter-vehicle distance extension adjustment (S130). In other words, when the point at which the other vehicle is detected by the laterally-adjacent vehicle detecting section 30 is a meeting point, the cut-in detecting section 12 judges that the likelihood of a cut-in is high. Therefore, the inter-vehicle distance control section 40 is performs deceleration control. The inter-vehicle distance to the leading vehicle is increased.

In other words, unlike in conventional technology, adjustment for increasing the inter-vehicle distance is performed when a cut-in by a vehicle laterally adjacent to the own vehicle is judged likely to occur, rather than when a vehicle cuts in front of the own vehicle. Therefore, the inter-vehicle distance control between the own vehicle and the other vehicle is not delayed. Situations in which the drivers of both the other vehicle and the own vehicle experience unease are reduced.

Figure 4B:
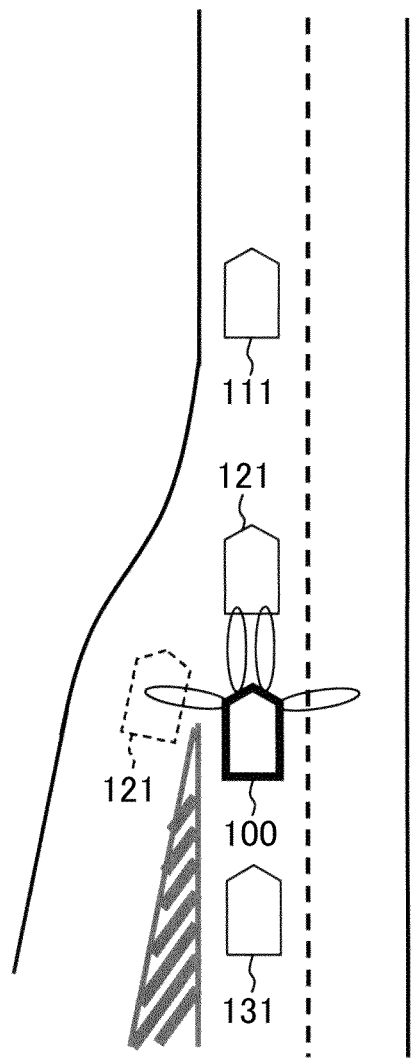

In addition, when an other vehicle that is a laterally adjacent vehicle 121 successively attempting to cut in front of the own vehicle 100 is detected (YES at S150 in FIG. 3) as indicated by the broken line in FIG. 4B, the calculating section 10 performs the inter-vehicle distance shortening adjustment (S160). In other words, the successive cut-in detecting section 12 is included that judges whether or not a successive cut-in is likely to occur after the cut-in by the other vehicle is completed, based on the presence of another vehicle detected by the laterally-adjacent vehicle detecting section 30. When the successive cut-in detecting section 12 judges that a successive cut-in is likely to occur, the inter-vehicle distance adjusting section 14 performs the inter-vehicle distance shortening adjustment to shorten the inter-vehicle distance. Therefore, the inter-vehicle distance control section 40 performs acceleration control. The inter-vehicle distance to the other vehicle that has become the leading vehicle 121 is shortened. As a result, a situation in which another vehicle successively cuts in front of the own vehicle can be suppressed. Furthermore, when the other vehicle that is a laterally adjacent vehicle 121 attempting to successively cut in front of the own vehicle 100 is not detected (NO at S150 in FIG. 3), the calculating section 10 performs the inter-vehicle distance returning adjustment (S160). In other words, when the successive cut-in detecting section 12 judges that a successive cut-in is unlikely to occur, the inter-vehicle distance adjusting section 14 performs the inter-vehicle distance returning adjustment to return the inter-vehicle distance to the inter-vehicle distance set in advance. Therefore, the inter-vehicle distance control section 40 performs control to maintain the set inter-vehicle distance. As a result, in a situation in which no other vehicle is attempting to cut in, unnecessary acceleration and the like are not performed. Obstruction to the flow of traffic can be inhibited. For example, unnecessary acceleration by an other vehicle that is following vehicle 131 present behind the own vehicle 100, shown in FIG. 4B, is not precipitated.

Second Embodiment

Figure 5:
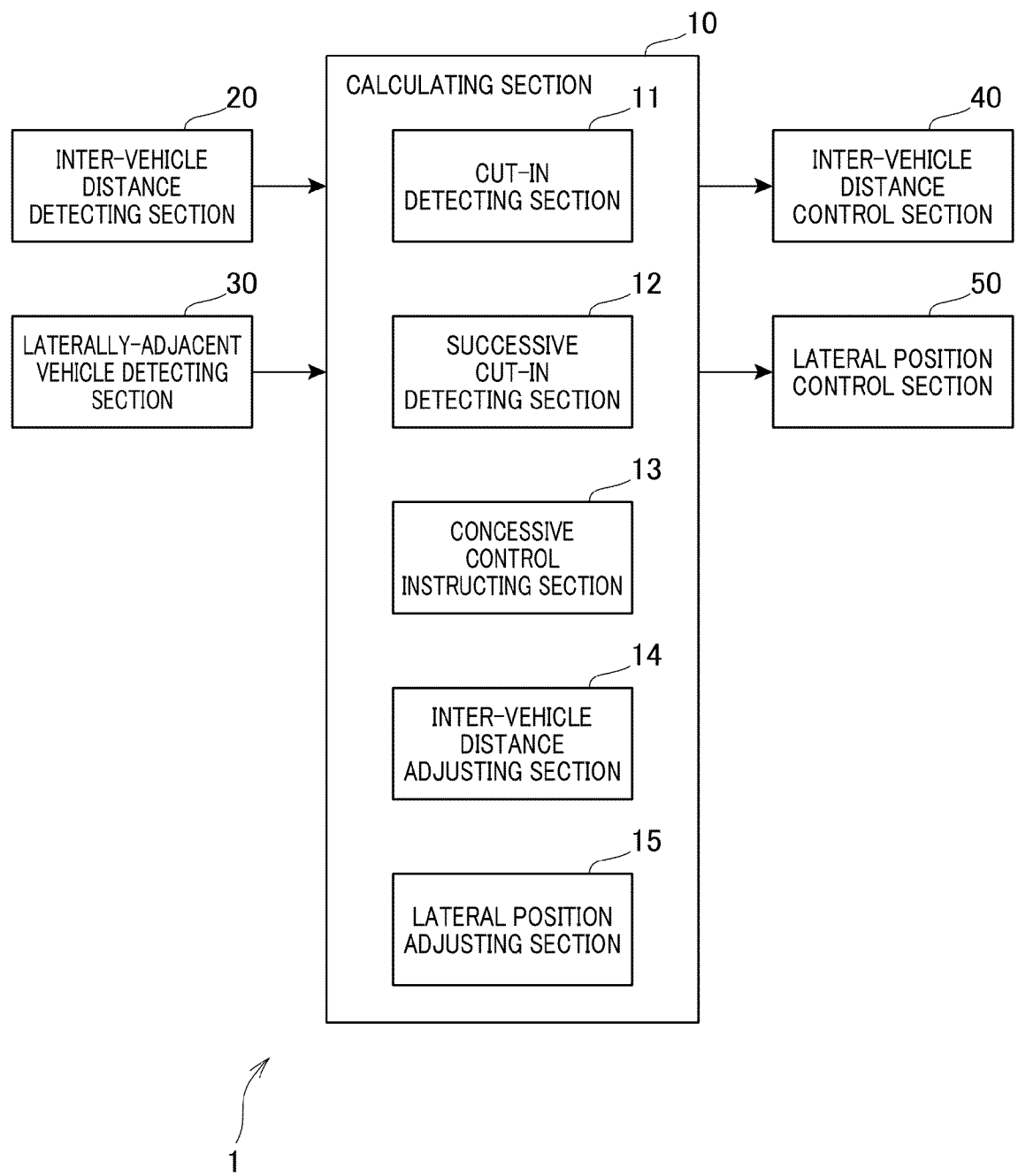
FIG. 5 is a block diagram of an overall configuration of an inter-vehicle distance control device according to a second embodiment.

As shown in FIG. 5, an inter-vehicle distance control device 1 according to a second embodiment is configured with the calculating section 10 as a main component, in a manner similar to the above-described inter-vehicle distance control device 1 according to the first embodiment. According to the second embodiment, a lateral position control section 50 is additionally connected to the calculating section 10. Components similar to those according to the above-described first embodiment are given the same reference numbers. Descriptions thereof are omitted.

The lateral position control section 50 controls the lateral-direction position of the own vehicle in the own lane, which is the cruising lane in which the own vehicle is traveling. In other words, a situation can be considered in which the own vehicle is offset to the right side or the left side within the own lane. The lateral position control section 50 quantifies such situations and performs control. Specifically, for example, the lateral position control section 50 may be configured by an imaging section, a quantifying section, and a control section. The imaging section is used to detect the division lines of the cruising lane and the like. The quantifying section quantifies the lateral-direction position of the own vehicle based on an image from the imaging section. The control section performs electric power steering (EPS) control based on the lateral-direction position quantified by the quantifying section and lateral position adjustment information from the calculating section 10. As a result of the imaging section being provided, the position of the own vehicle, or in other words, an offset to the left or right with reference to the center of the cruising lane (lane center), a yaw angle that is an angle formed by the center line of the cruising lane and the own vehicle, and the like can be detected. Therefore, the quantifying section quantifies the lateral-direction position based on pieces of information such as these.

At this time, the calculating section 10 includes a lateral position adjusting section 15 as a functional block. When an instruction is received from the concessive control instructing section 13, the lateral position adjusting section 15 performs adjustment of the lateral-direction position to move the own vehicle away from the other vehicle. The lateral position adjusting section 15 also performs adjustment to return the own vehicle to the original lateral-direction position after the cut-in by the other vehicle is completed.

Figure 6:
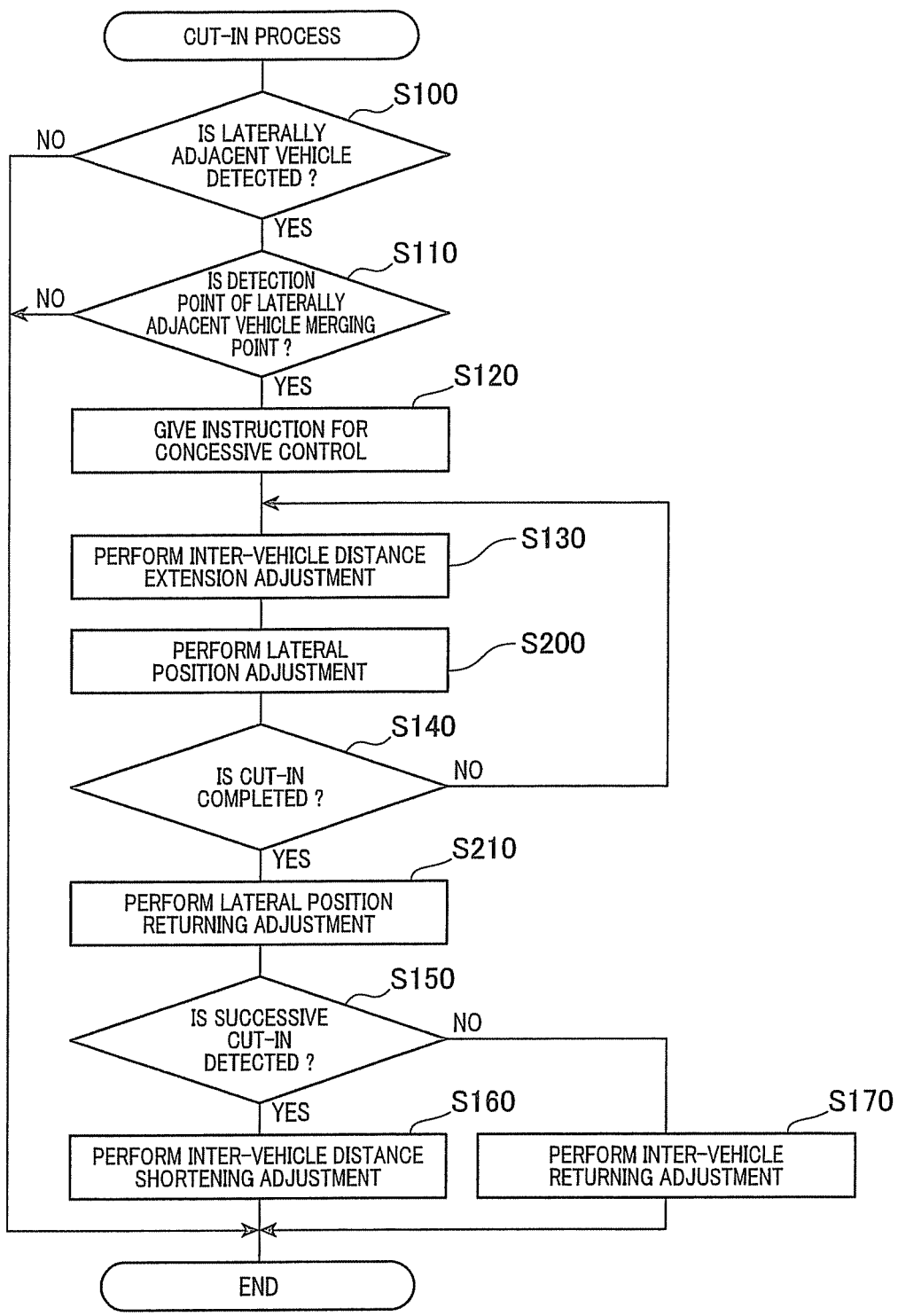
FIG. 6 is a flowchart of a cut-in process according to the second embodiment.

Next, the cut-in process performed by the calculating section 10 will be described based on the flowchart in FIG. 6. The cut-in process is repeatedly performed at a predetermined time interval by the calculating section 10.

Here, the cut-in process according to the second embodiment differs from that according to the first embodiment in that, after the inter-vehicle distance extension adjustment (S130) is performed, the calculating section 10 performs lateral position adjustment at S200. In addition, after the cut-in by the other vehicle is completed (YES at S140), the calculating section 10 performs lateral position returning adjustment at S210.

When judged that the laterally adjacent vehicle is detected (YES at S100) and the point at which the laterally adjacent vehicle is detected is a meeting point at which the likelihood of a cut-in is high (YES at S110), the processing operation at S200 is performed to offset the lateral-direction position of the own vehicle within the own lane towards the direction away from the laterally adjacent vehicle. For example, when the other vehicle is cutting in from the left side, an instruction is given for the lateral-direction position to be offset to the right side. This processing operation is actualized as a function of the lateral position adjusting section 15. Offset information regarding the offset of the lateral-direction position to the right side or the left side is outputted from the lateral position adjusting section 15 as the lateral position adjustment information. As a result, the lateral position control section 50 actually offsets the lateral-direction position of the own vehicle by EPS control based on the quantified lateral-direction position and the offset information.

Figure 7A:
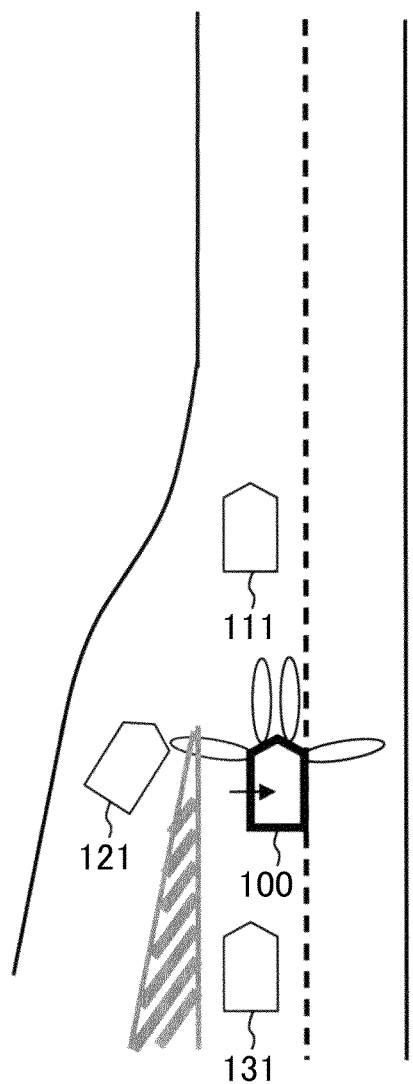
FIG. 7A and FIG. 7B are explanatory diagrams of specific examples of a cut-in according to the second embodiment.

In the cut-in process described above, when an other vehicle that is a laterally adjacent vehicle 121 is detected beside an own vehicle 102 (YES at S100 in FIG. 6) as shown in FIG. 7A, the calculating section 10 judges whether or not the point at which the other vehicle that is a laterally adjacent vehicle 121 is detected is a meeting point (S110). When judged that the point is a meeting point (YES at S110), the calculating section 10 judges that the likelihood of a cut-in is high and gives an instruction for concessive control (S120). When the cut-in is not yet completed (NO at S140), the calculating section 10 performs the inter-vehicle distance extension adjustment and the lateral position adjustment (S130 and S200). In other words, the lateral position adjusting section 15 and the lateral position control section 50 are included. When the lateral position that is the traveling position in the lateral direction in the own lane can be adjusted and the cut-in detecting section 11 judges that a cut-in is likely to occur, the lateral position adjusting section 15 performs the lateral position adjustment to offset the lateral position to the direction away from the other vehicle. The lateral position control section 50 controls the lateral position based on the information from the lateral position adjusting section 15. Therefore, the inter-vehicle distance control section 40 performs deceleration control. The inter-vehicle distance to the leading vehicle is increased. In addition, the offset of the lateral-direction position towards the direction away from the laterally adjacent vehicle is actualized.

In other words, an operation that is "concession" to the other vehicle attempting to cut in and an operation that is "moving away" from the other vehicle are performed when the likelihood of a cut-in is high. Therefore, the inter-vehicle distance control between the own vehicle and the other vehicle is not delayed. The lateral position can be adjusted to the direction away from the other vehicle. Therefore, situations in which the drivers of both the other vehicle and the own vehicle experience unease are further reduced.

In addition, when the cut-in in front of the own vehicle is completed (YES at S140 in FIG. 6), the calculating section 10 performs the lateral position returning adjustment (S210). In other words, when the cut-in by the other vehicle is completed, the lateral position adjusting section 15 performs the lateral position returning adjustment to return the lateral position to the original lateral position. As a result, when the cut-in is completed, the own vehicle automatically returns to its original lateral position. Therefore, this adjustment is convenient.

Still further, effects similar to those according to the first embodiment are achieved in terms of the inter-vehicle distance shortening adjustment (S160 in FIG. 6) and the inter-vehicle distance returning adjustment (S170) being performed.

Figure 7B:
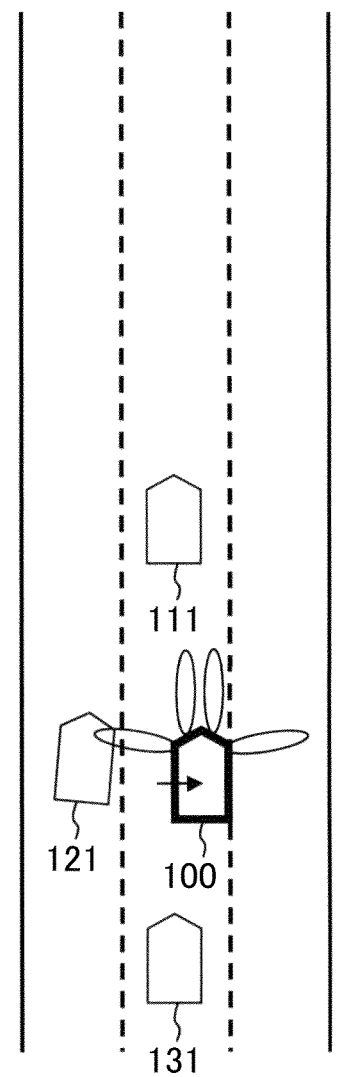

As shown in FIG. 7B, a cut-in may be judged to occur when an approach made by an other vehicle that is a laterally adjacent vehicle 121 traveling parallel towards an own vehicle 100 is acknowledged. Specifically, the calculating section 10 judges at S110 whether or not the distance between the other vehicle 121 and the own vehicle 100 is becoming shorter in FIG. 6. For example, the distance to the other vehicle 121 is repeatedly calculated at a predetermined time interval. Whether or not the transition of the calculated distances exceeds a threshold value is judged. In other words, the laterally-adjacent vehicle detecting section 30 is configured to be capable of measuring the distance to another vehicle. When the distance to the other vehicle is becoming shorter based on the results of a plurality of detection operations by the laterally-adjacent vehicle detecting section 30, the cut-in detecting section 12 may judge that a cut-in is likely to occur. As a result of this configuration, similar effects are achieved regarding cut-in during ordinary cruising, in addition to cut-in at meeting points as shown in FIG. 7A. Judgment regarding whether or not the point at which the laterally adjacent vehicle is detected is a meeting point and judgment regarding the approach of a laterally adjacent vehicle may both be performed.

Third Embodiment

Figure 8:
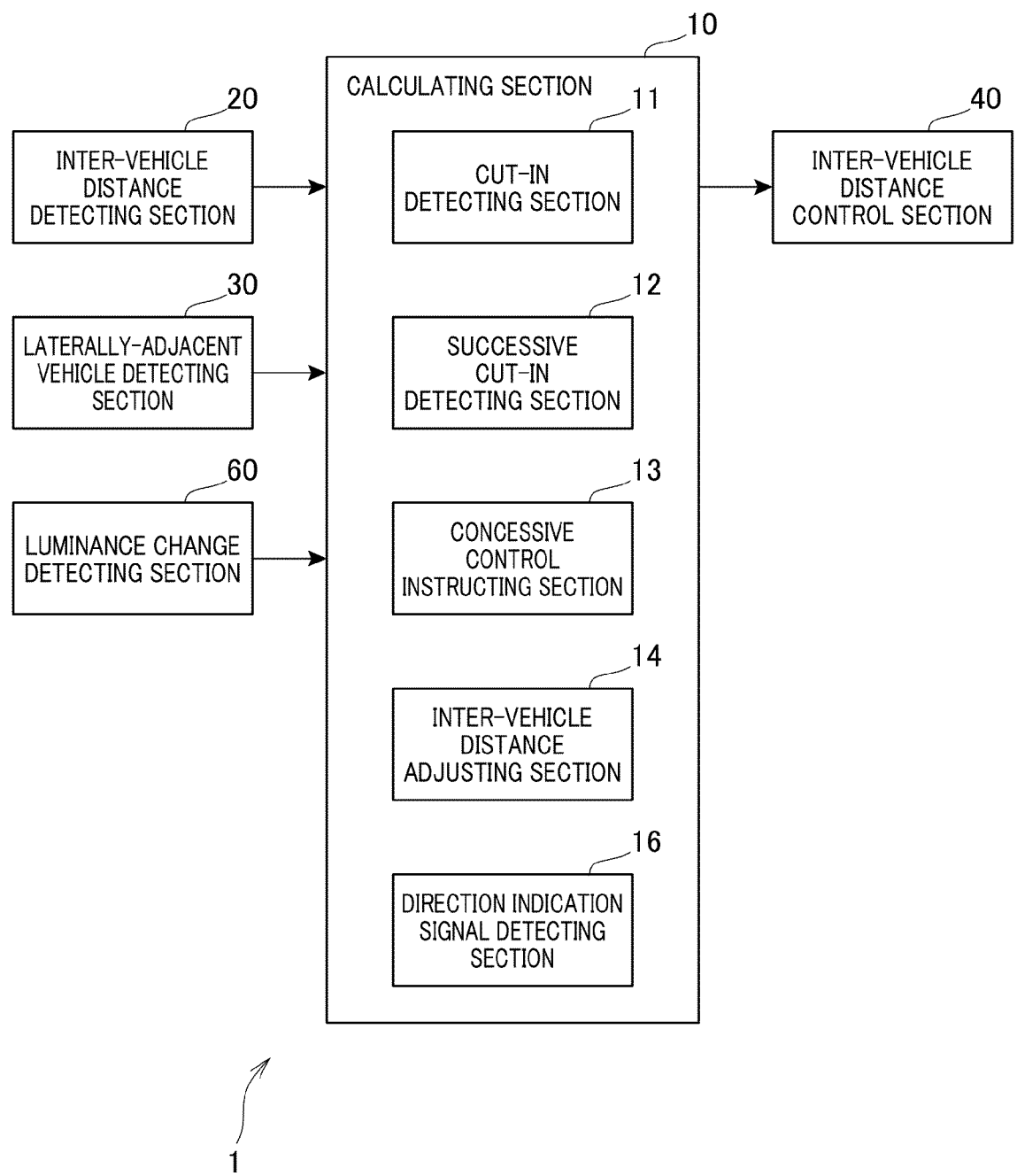
FIG. 8 is a block diagram of an overall configuration of an inter-vehicle distance control device according to a third embodiment.

As shown in FIG. 8, an inter-vehicle distance control device 1 according to a third embodiment is configured with the calculating section 10 as a main component, in a manner similar to the above-described inter-vehicle distance control device 1 according to the first embodiment. According to the third embodiment, a luminance change detecting section 60 is additionally connected to the calculating section 10. Components similar to those according to the above-described embodiments are given the same reference numbers. Descriptions thereof are omitted.

The luminance change detecting section 60 detects changes in luminance in another lane adjacent to the own lane. Specifically, the luminance change detecting section 60 is realized as an imaging section, such as a camera, attached to the front section and the side section of the own vehicle. Alternatively, the luminance change detecting section 60 is realized as a light detecting section, such as a photodiode, embedded in the side marker lamp or the headlight of the own vehicle. The imaging section and the light detecting section may both be included.

At this time, the calculating section 10 includes a direction indication signal detecting section 16 as a functional block. The direction indication signal detecting section 16 detects the blinking of a direction indicator of another vehicle traveling in an adjacent other lane, based on information outputted from the luminance change detecting section 60. Specifically, the direction indication signal detecting section 16 detects a blinking interval and judges that the direction indicator is blinking based on images from the imaging section or signals from the photodiode. In addition, the color of the blinking light may also be determined in the configuration including the imaging section.

Figure 9:
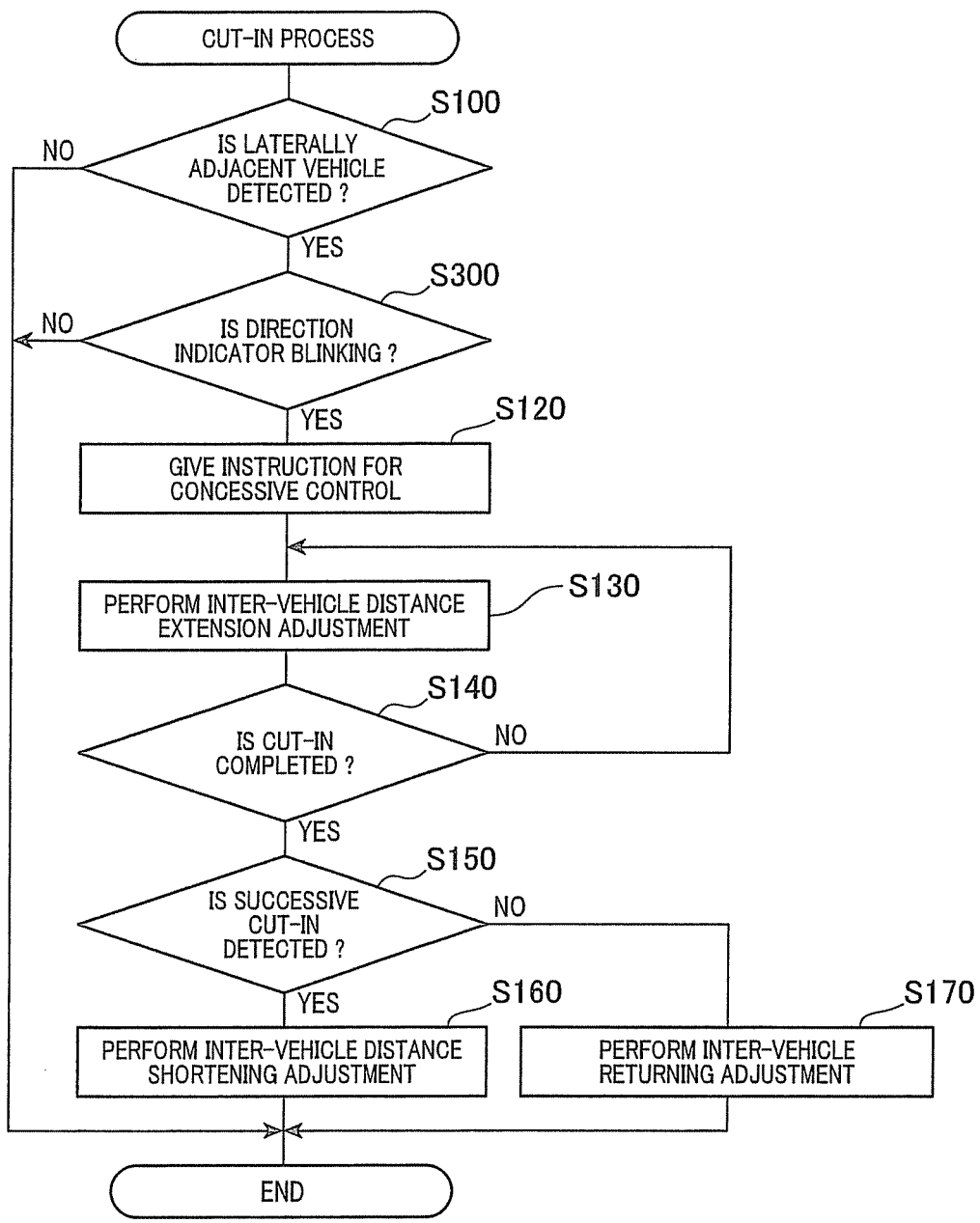
FIG. 9 is a flowchart of a cut-in process according to the third embodiment.

Next, the cut-in process performed by the calculating section 10 will be described based on the flowchart in FIG. 9. The cut-in process is repeatedly performed at a predetermined time interval by the calculating section 10.

Here, the cut-in process according to the third embodiment differs from that according to the first embodiment in that, instead of the judgment process regarding whether or not the point at which a laterally adjacent vehicle is detected is a meeting point (S110 in FIG. 3), the calculating section 10 judges at S300 whether or not a direction indicator is blinking. Here, when judged that a direction indicator is blinking (YES at S300), the calculating section 10 performs the inter-vehicle distance adjustment similar to that according to the first embodiment.

Figure 10:
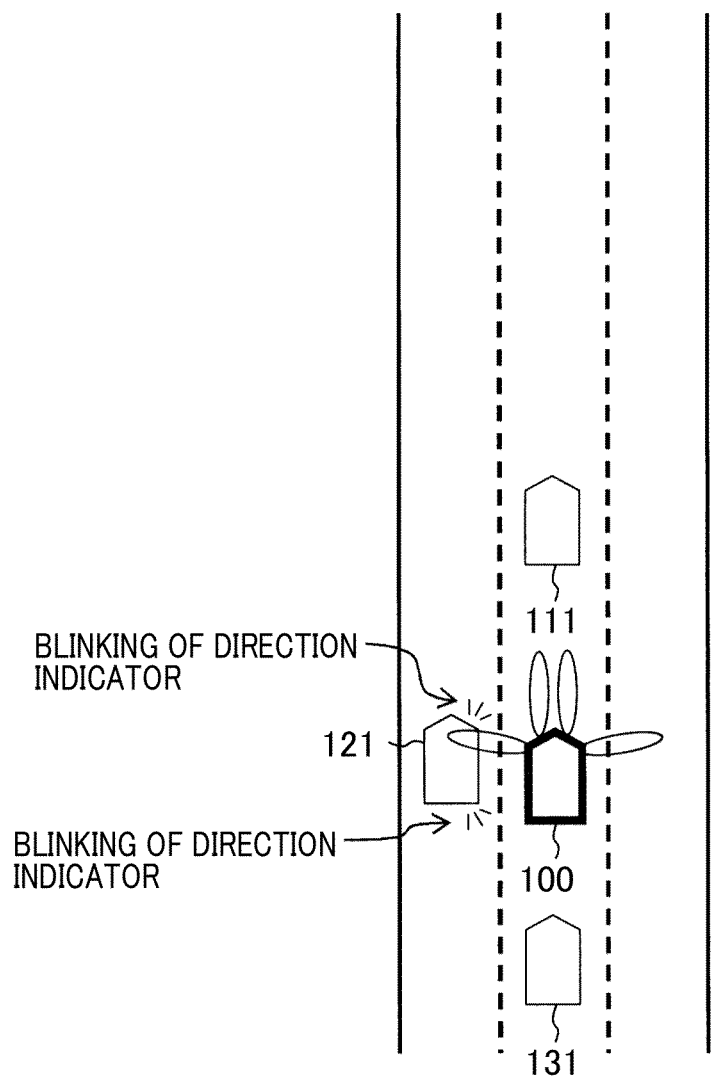
FIG. 10 is an explanatory diagram of a specific example of a cut-in according to the third embodiment.

In the cut-in process described above, when an other vehicle 121 that is a laterally adjacent vehicle is detected beside an own vehicle 100 (YES at S100 in FIG. 9) as shown in FIG. 10, the calculating section 10 judges whether or not the direction indicator is blinking (S300). When judged that the direction indicator is blinking (YES at S300), the calculating section 10 judges that the likelihood of a cut-in is high and gives an instruction for concessive control (S120). When the cut-in is not yet completed (NO at S140), the calculating section 10 performs the inter-vehicle distance extension adjustment (S130). In other words, the luminance change detecting section 60 and the direction indication signal detecting section 16 are included. The luminance change detecting section 60 detects changes in luminance in another lane adjacent to the own lane. The direction indication signal detecting section 16 judges whether or not the direction indicator of another vehicle is blinking based on the changes in luminance detected by the luminance change detecting section 60. When the direction indication signal detecting section 16 judges that the direction indicator of the other vehicle is blinking, the cut-in detecting section 12 judges that a cut-in is likely to occur. Therefore, the inter-vehicle distance control section 40 performs deceleration control. The inter-vehicle distance to the leading vehicle is increased.

In other words, in this instance, the blinking of the direction indicator of the other vehicle is used to judge the likelihood of a cut-in. Therefore, the inter-vehicle distance control between the own vehicle and the other vehicle is not delayed. Situations in which the drivers of both the other vehicle and the own vehicle experience unease are reduced.

In addition, effects similar to those according to the above-described embodiments are achieved in terms of the inter-vehicle distance shortening adjustment (S160 in FIG. 9) and the inter-vehicle distance returning adjustment (S170) being performed.

Fourth Embodiment

Figure 11:
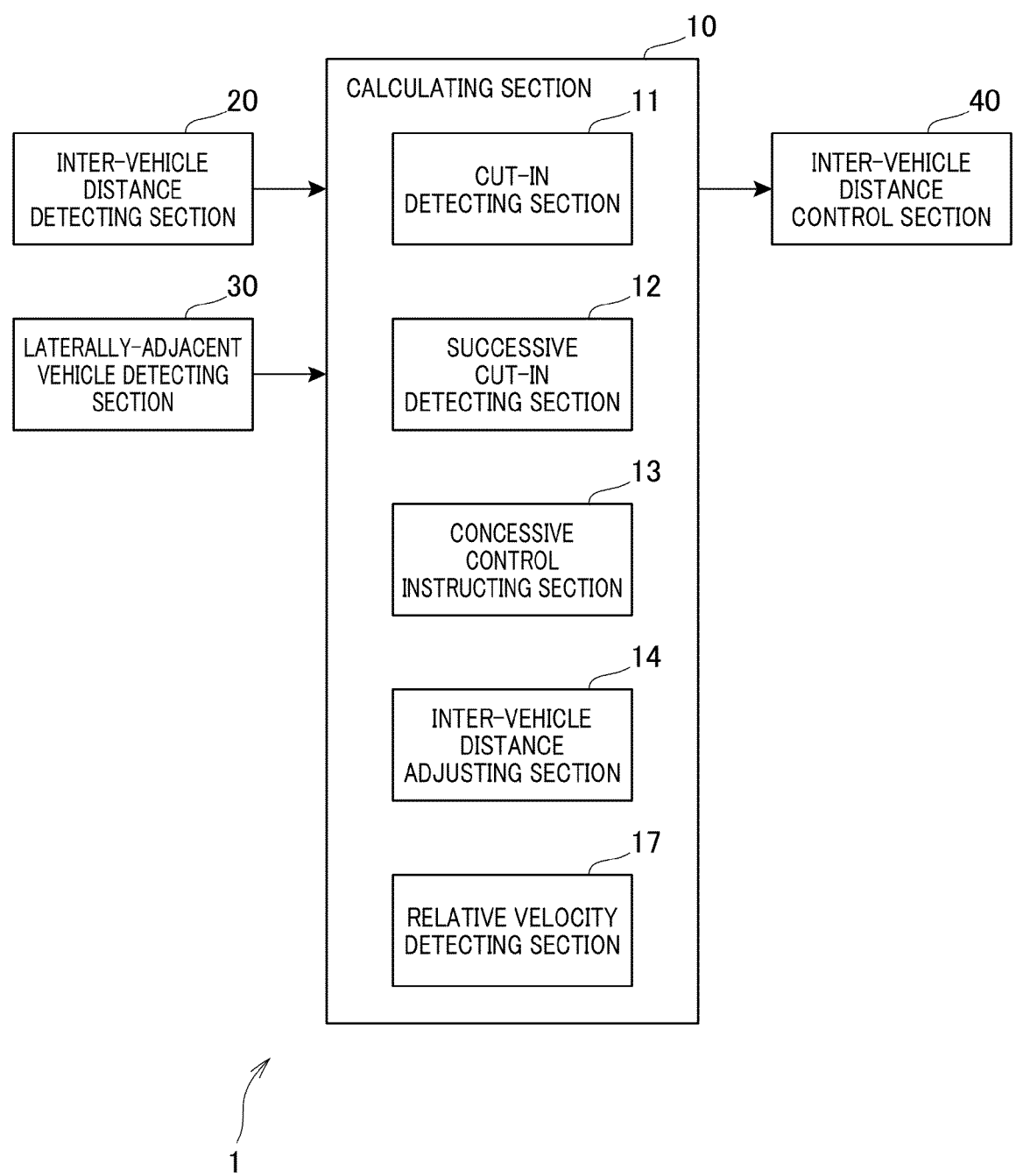
FIG. 11 is a block diagram of an overall configuration of an inter-vehicle distance control device according to a fourth embodiment.
Figure 12:
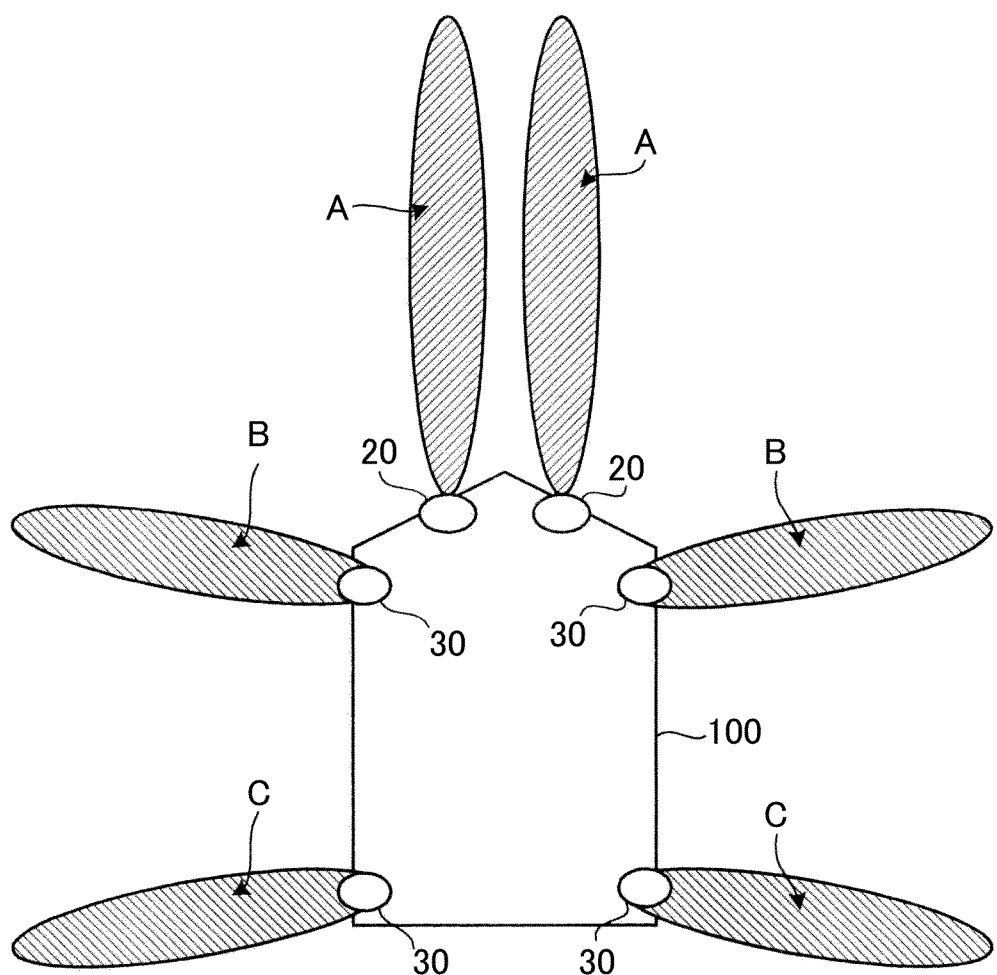
FIG. 12 is an explanatory diagram of the placement of each detecting section and detection areas of the detecting sections.

As shown in FIG. 11, an inter-vehicle distance control device 1 according to a fourth embodiment is configured with the calculating section 10 as a main component, in a manner similar to the above-described inter-vehicle distance control device 1 according to the first embodiment. According to the fourth embodiment as well, laterally-adjacent vehicle detecting sections 30 are connected to the calculating section 10. However, unlike the laterally-adjacent vehicle detecting sections 30 according to the first embodiment, the laterally-adjacent vehicle detecting sections 30 are included in the front section and the rear section of the vehicle. Specifically, as shown in FIG. 12, in the laterally-adjacent vehicle detecting sections 30, the detection areas are lateral detection areas B towards the front of the vehicle and lateral detection areas C towards the rear. Therefore, the laterally-adjacent vehicle detecting sections 30 are capable of detecting a relative velocity, in relation to the own vehicle, of another vehicle traveling parallel to the own vehicle, based on the deviation of the detection timings in the detection area B and the detection area C. Components similar to those according to the above-described embodiments are given the same reference numbers. Descriptions thereof are omitted.

The calculating section 10 includes a relative velocity detecting section 17 as a functional block. The relative velocity detecting section 17 detects the relative velocity of another vehicle traveling in an adjacent other lane, in relation to the own vehicle.

Next, the cut-in process performed by the calculating section 10 will be described based on the flowchart in FIG. 13. The cut-in process is repeatedly performed at a predetermined time interval by the calculating section 10.

Here, the cut-in process according to the fourth embodiment differs from that according to the above-described first embodiment in that, instead of the judgment process regarding whether or not the point at which a laterally adjacent vehicle is detected is a meeting point (S110 in FIG. 3), the calculating section 10 judges at S400 whether or not the relative velocity is greater than a threshold value set in advance. Here, when judged that the relative velocity is greater than the threshold value (YES at S400), the calculating section 10 performs the inter-vehicle distance adjustment similar to that according to the above-described first embodiment. In other words, when the relative velocity of the other vehicle traveling parallel to the own vehicle is high, the calculating section 10 judges that the likelihood of the other vehicle passing the own vehicle and cutting in front of the own vehicle is high.

In the cut-in process described above, when an other vehicle 121 that is a laterally adjacent vehicle is detected beside an own vehicle 105 (YES at S100 in FIG. 13) as shown in FIG. 14, the calculating section 10 judges whether or not the relative velocity of the other vehicle in relation to the own vehicle is greater than the threshold value (S400). Here, when judged that the relative velocity is greater than the threshold value (YES at S400), the calculating section 10 judges that the likelihood of a cut-in is high and gives an instruction for concessive control (S120). When the cut-in is not yet completed (NO at S140), the calculating section 10 performs the inter-vehicle distance extension adjustment (S130). In other words, the relative velocity detecting section 17 is included that detects the relative velocity of the other vehicle in relation to the own vehicle based on the results of a plurality of detection operations by the laterally-adjacent vehicle detecting section 30. When judged that the relative velocity detected by the relative velocity detecting section 17 is greater than the threshold value set in advance, the cut-in detecting section 12 judges that a cut-in is likely to occur.

In other words, in this instance, the relative velocity of the other vehicle in relation to the own vehicle is used to judge the likelihood of a cut-in. Therefore, the inter-vehicle distance control between the own vehicle and the other vehicle is not delayed. Situations in which the drivers of both the other vehicle and the own vehicle experience unease are reduced.

In addition, effects similar to those according to the above-described embodiments are achieved in terms of the inter-vehicle distance shortening adjustment (S160 in FIG. 13) and the inter-vehicle distance returning adjustment (S170) being performed. Here, the likelihood of a cut-in is judged by only the relative velocity. However, as shown in FIG. 14B, an approach made by an other vehicle 125 towards the own vehicle 105 may be determined in addition to the judgment regarding relative velocity. In other words, the laterally-adjacent vehicle detecting section 31 is configured to be capable of measuring the distance to another vehicle. When the distance to the other vehicle is becoming shorter based on the results of a plurality of detection operations by the laterally-adjacent vehicle detecting section 30, the cut-in detecting section 12 may judge that a cut-in is likely to occur. As a result of this configuration, the likelihood of a cut-in occurring can be determined with further certainty.

Fifth Embodiment

Figure 15:
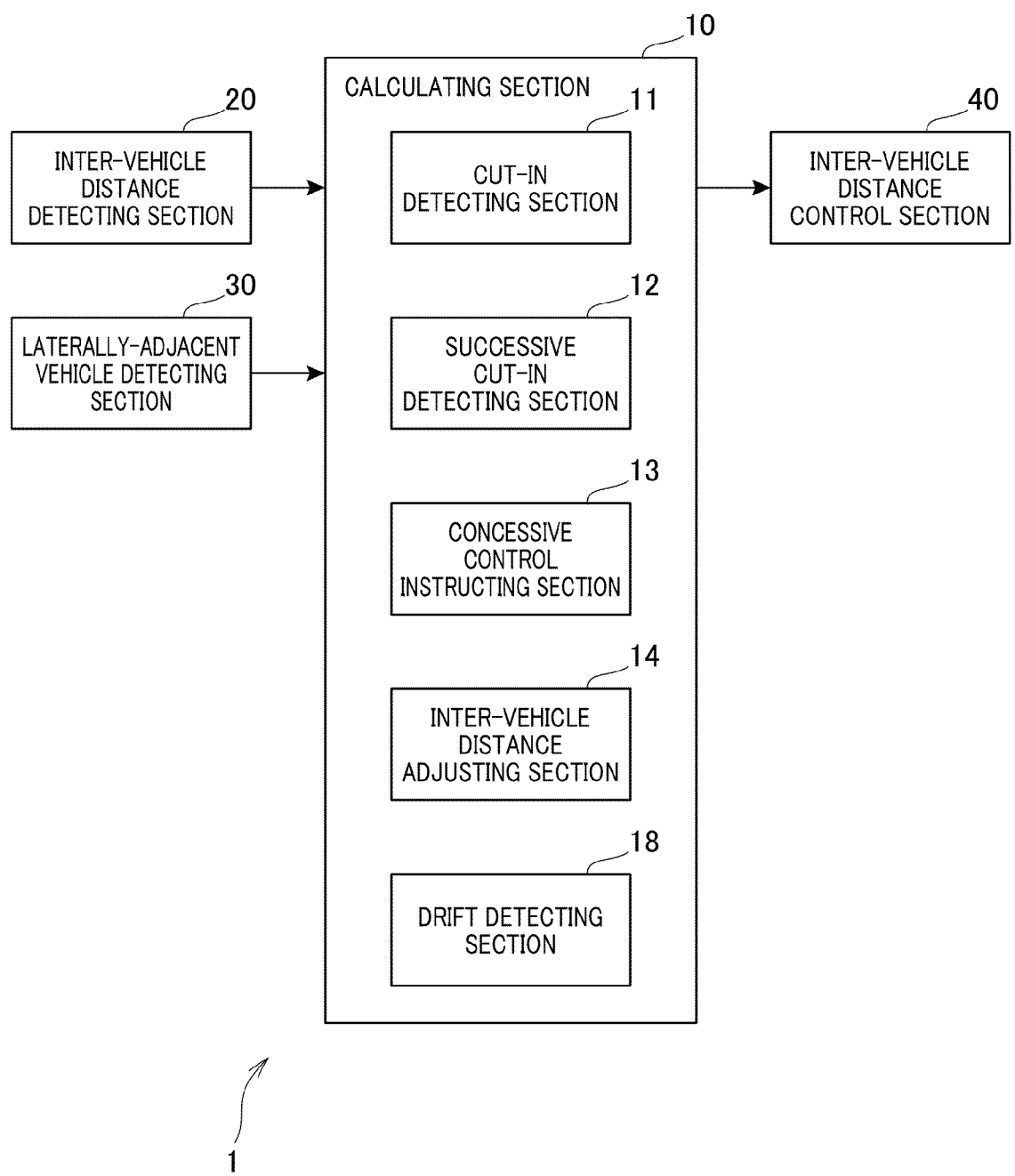
FIG. 15 is a block diagram of an overall configuration of an inter-vehicle distance control device according to a fifth embodiment.

As shown in FIG. 15, an inter-vehicle distance control device 1 according to a fifth embodiment is configured with the calculating section 10 as a main component, in a manner similar to the above-described inter-vehicle distance control device 4 according to the fourth embodiment. The inter-vehicle distance control device 5 also includes the laterally-adjacent vehicle detecting sections 30. Components similar to those according to the above-described embodiments are given the same reference numbers. Descriptions thereof are omitted.

In this instance, the calculating section 10 has a drift detecting section 18 as a functional block. The drift detecting section 18 detects drifting by another vehicle traveling in another lane adjacent to the own lane, based on information outputted from the laterally-adjacent vehicle detecting section 30. Specifically, the drift detecting section 18 judges whether or not fluctuation in distance to the other vehicle that is a laterally adjacent vehicle detected by the laterally-adjacent vehicle detecting section 30 is greater than a threshold value set in advance. Here, the laterally-adjacent vehicle detecting sections 30 are included in the front section and the rear section of the vehicle (see FIG. 12). However, the laterally-adjacent vehicle detecting section 30 may be included in only one section of the vehicle. To perform accurate detection, the former is more effective. However, the configuration is merely required to be that capable of calculating the distance to the laterally adjacent vehicle.

Figure 16:
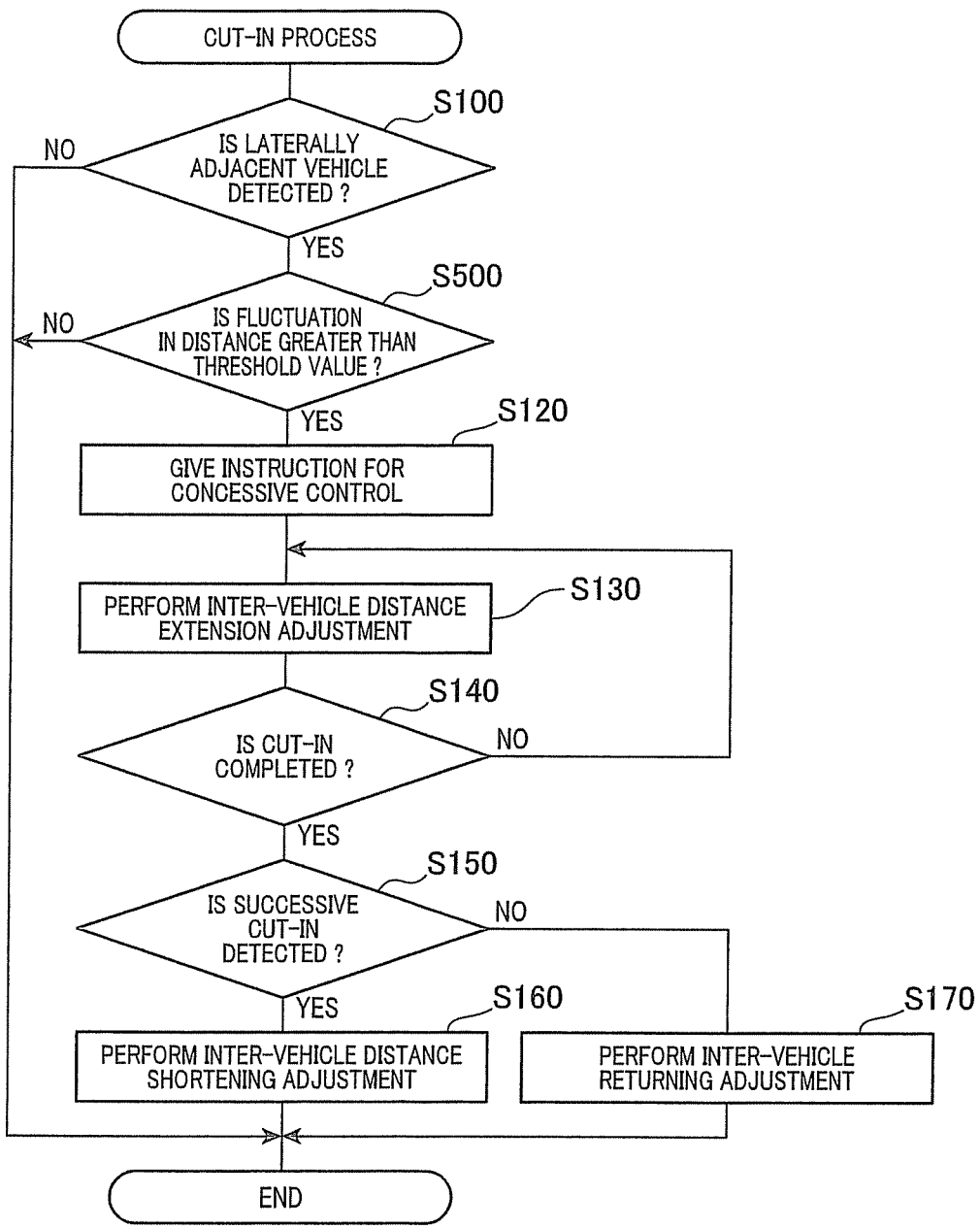
FIG. 16 is a flowchart of a cut-in process according to the fifth embodiment.

Next, the cut-in process performed by the calculating section 10 will be described based on the flowchart in FIG. 16. The cut-in process is repeatedly performed at a predetermined time interval by the calculating section 10.

Here, the cut-in process according to the fifth embodiment differs from that according to the above-described fourth embodiment in that, instead of the judgment process based on relative velocity, the calculating section 10 judges whether or not the fluctuation in the detected distance to a laterally adjacent vehicle is greater than the threshold value. When judged that the fluctuation in the distance is greater than the threshold value (YES at S500), the calculating section 10 performs the inter-vehicle distance adjustment similar to that according to the fourth embodiment.

Figure 17:
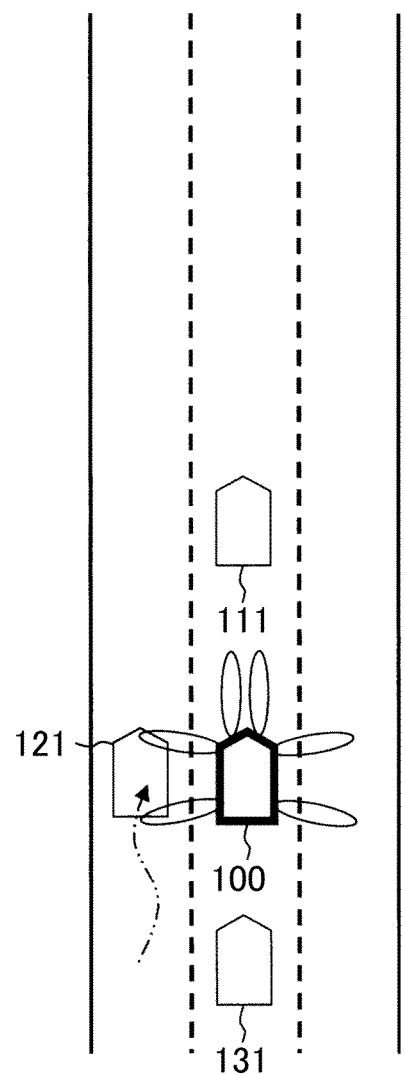
FIG. 17 is an explanatory diagram of a specific example of a cut-in according to the fifth embodiment.

In the cut-in process described above, when judged that an other vehicle 121 that is a laterally adjacent vehicle is detected beside an own vehicle 100 (YES at S100 in FIG. 16) as shown in FIG. 17, and judged that the fluctuation in the distance between the other vehicle 126 and the own vehicle 106 is greater than the threshold value (YES at S500), the calculating section 10 gives an instruction for concessive control (S120). When the cut-in is not yet completed (NO at S140), the calculating section 10 performs the inter-vehicle distance extension adjustment (S130). In other words, the laterally adjacent vehicle detecting section 30 is capable of measuring the distance to another vehicle. Furthermore, the drift detecting section 12 is included that judges whether or not the other vehicle is drifting depending on whether or not the fluctuation in the distance to the other vehicle is greater than a threshold value set in advance, based on the results of a plurality of detection operations by the laterally adjacent vehicle detecting section 30. When judged by the drift detecting section 18 that the other vehicle is drifting, the cut-in detecting section 12 judges that a cut-in is likely to occur.

In other words, in this instance, the drifting by another vehicle is used to judge the likelihood of a cut-in. This instance also includes, in addition to intentional cut-in, situations in which an approach made towards the own vehicle by another vehicle whose driver is almost dozing is judged to be a cut-in. Therefore, the inter-vehicle distance control between the own vehicle and the other vehicle is not delayed. Situations in which the drivers of both the other vehicle and the own vehicle experience unease are reduced In addition, effects similar to those according to the above-described embodiments are achieved in terms of the inter-vehicle distance shortening adjustment (S160 in FIG. 13) and the inter-vehicle distance returning adjustment (S170) being performed.

Sixth Embodiment

Figure 18:
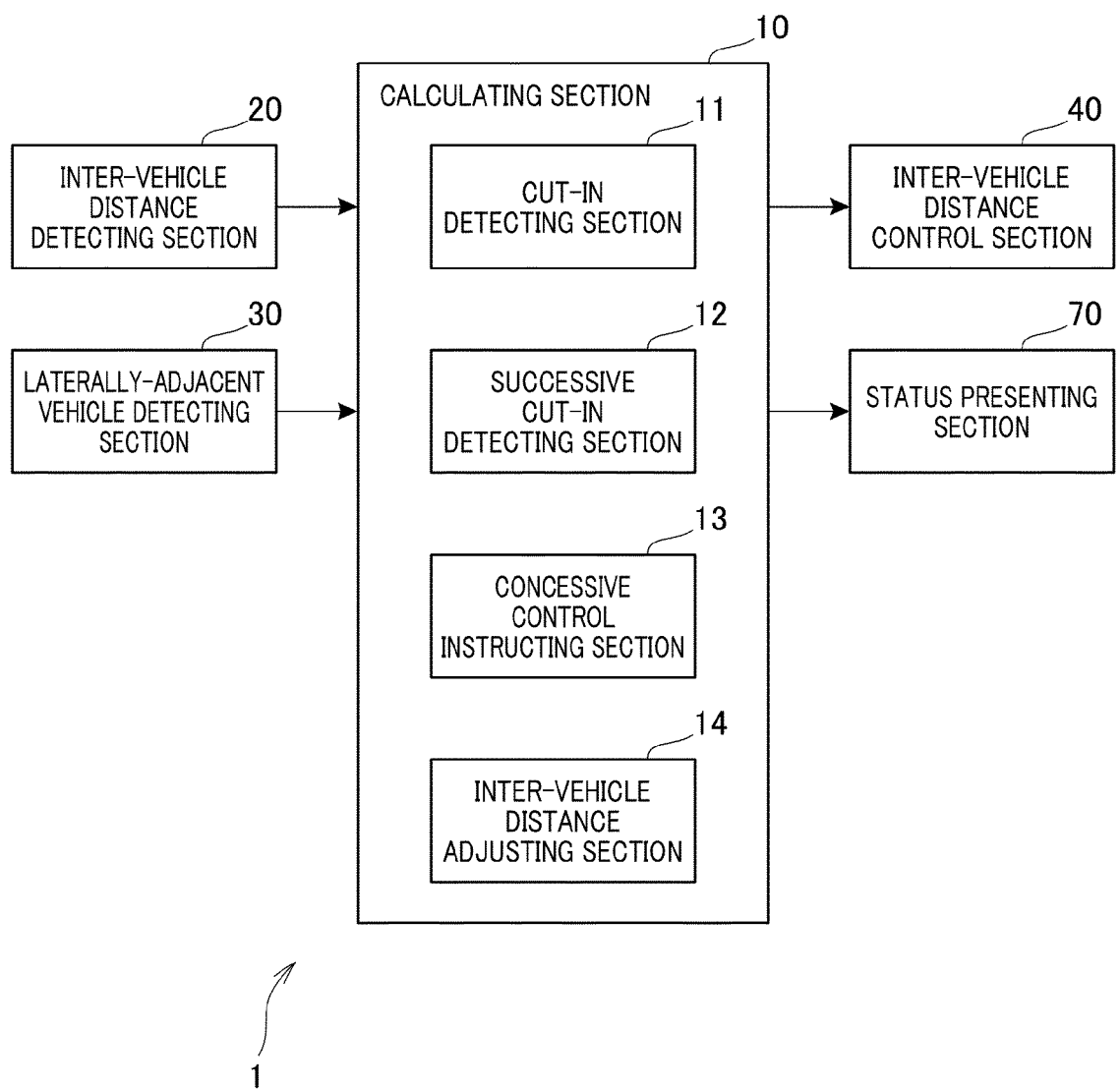
FIG. 18 is a block diagram of an overall configuration of an inter-vehicle distance control device according to a sixth embodiment.

As shown in FIG. 18, an inter-vehicle distance control device 1 according to a sixth embodiment is configured with the calculating section 10 as a main component, in a manner similar to the above-described inter-vehicle control device 1 according to the first embodiment. According to the sixth embodiment, a status presenting section 70 is additionally connected to the calculating section 10. Components similar to those according to the above-described embodiments are given the same reference numbers. Descriptions thereof are omitted.

The status presenting section 70 is used to present the driver with status during a cut-in. Use of at least one of a speaker, a display, a light emitter such as a light emitting diode (LED), and a motor as the status presenting section 70 can be considered. As a result, the status presenting section 70 presents the status using sound, image, light, vibrations, or the like. For example, when sound is used, the status presenting section 70 outputs a message such as "vehicle cut-in detected" or "merging vehicle detected". Furthermore, the status presenting section 70 may output a sound effect that gives advance notice of message output, such as a "pong" sound or a "pong-pong" sound, before message output.

Figure 19:
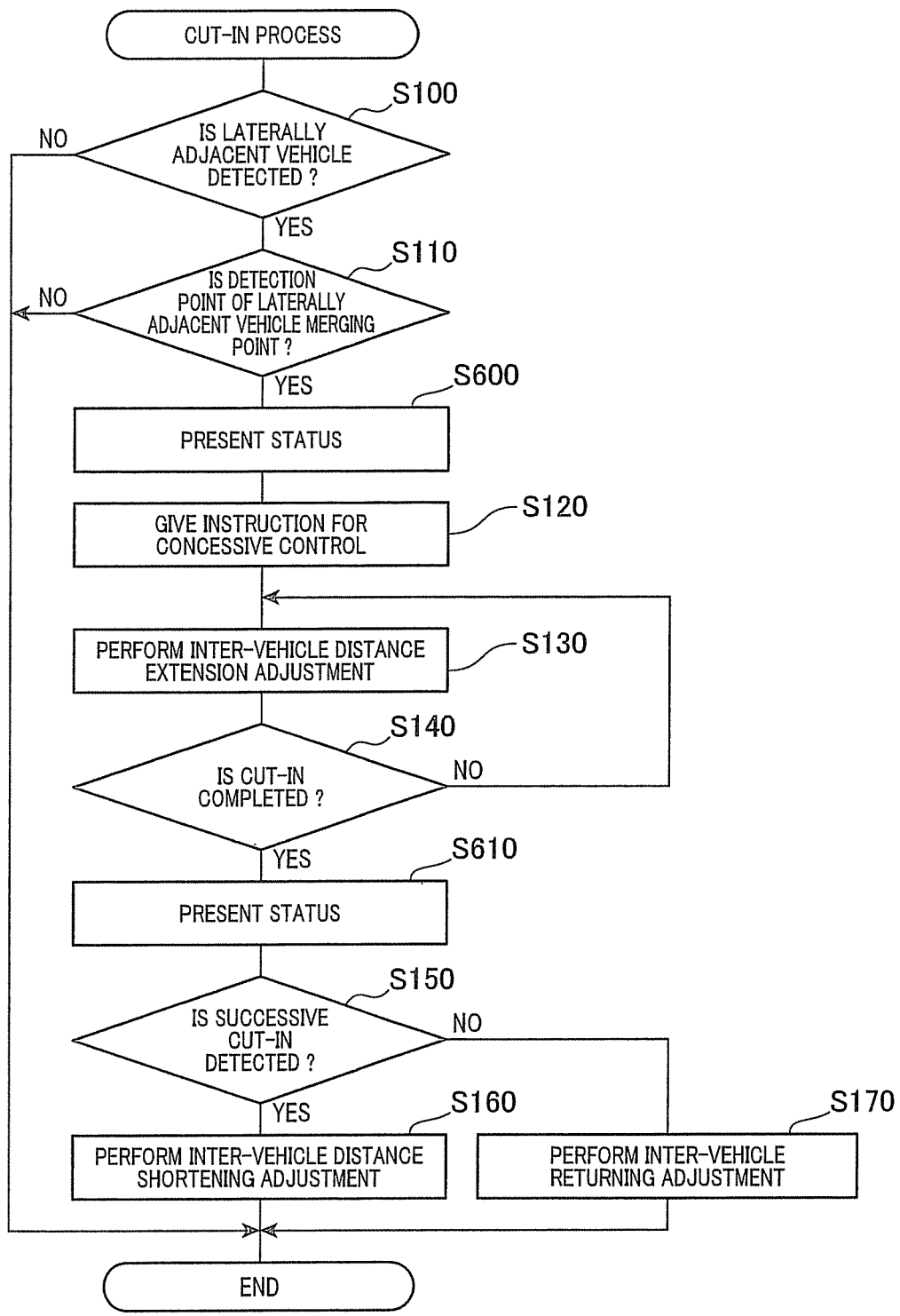
FIG. 19 is a flowchart of a cut-in process according to the sixth embodiment.

Next, the cut-in process performed by the calculating section 10 will be described based on the flowchart in FIG. 19. The cut-in process is repeatedly performed at a predetermined time interval by the calculating section 10.

Here, the cut-in process according to the sixth embodiment differs from that according to the first embodiment in that, after judged that a cut-in is likely to occur (YES at S100 and YES at S110 in FIG. 19), the calculating section 10 performs status presentation at S600. Furthermore, when judged that the cut-in is completed (YES at S140), the calculating section 10 performs status presentation at S610. In other words, the status presenting section 70 is included that presents the driver with status related to vehicle control during the vehicle control.

For example, when status presentation is performed by sound emitted through a speaker, at S600, the calculating section 10 performs guidance stating "A cutting-in vehicle is detected. Conceding to cutting-in vehicle" following the "pong" sound effect. In addition, at S610, the calculating section 10 performs guidance stating "Cut-in is completed. Returning to original setting.", following the "pong-pong" sound effect. When judged that a successive cut-in is detected (YES at S150), the calculating section 10 may perform guidance stating "Successive cut-in is detected. Approaching leading vehicle.", following the "pong" sound effect before performing the inter-vehicle distance shortening adjustment.

In the cut-in process such as that described above, the driver can easily understand the behavior of the vehicle. The cut-in process contributes to driving assistance.

In addition, effects similar to those according to the above-described embodiments are achieved in terms of the inter-vehicle distance extension adjustment (S130 in FIG. 19), the inter-vehicle distance shortening adjustment (S160) and the inter-vehicle distance returning adjustment (S170) being performed.

Seventh Embodiment

Figure 20:
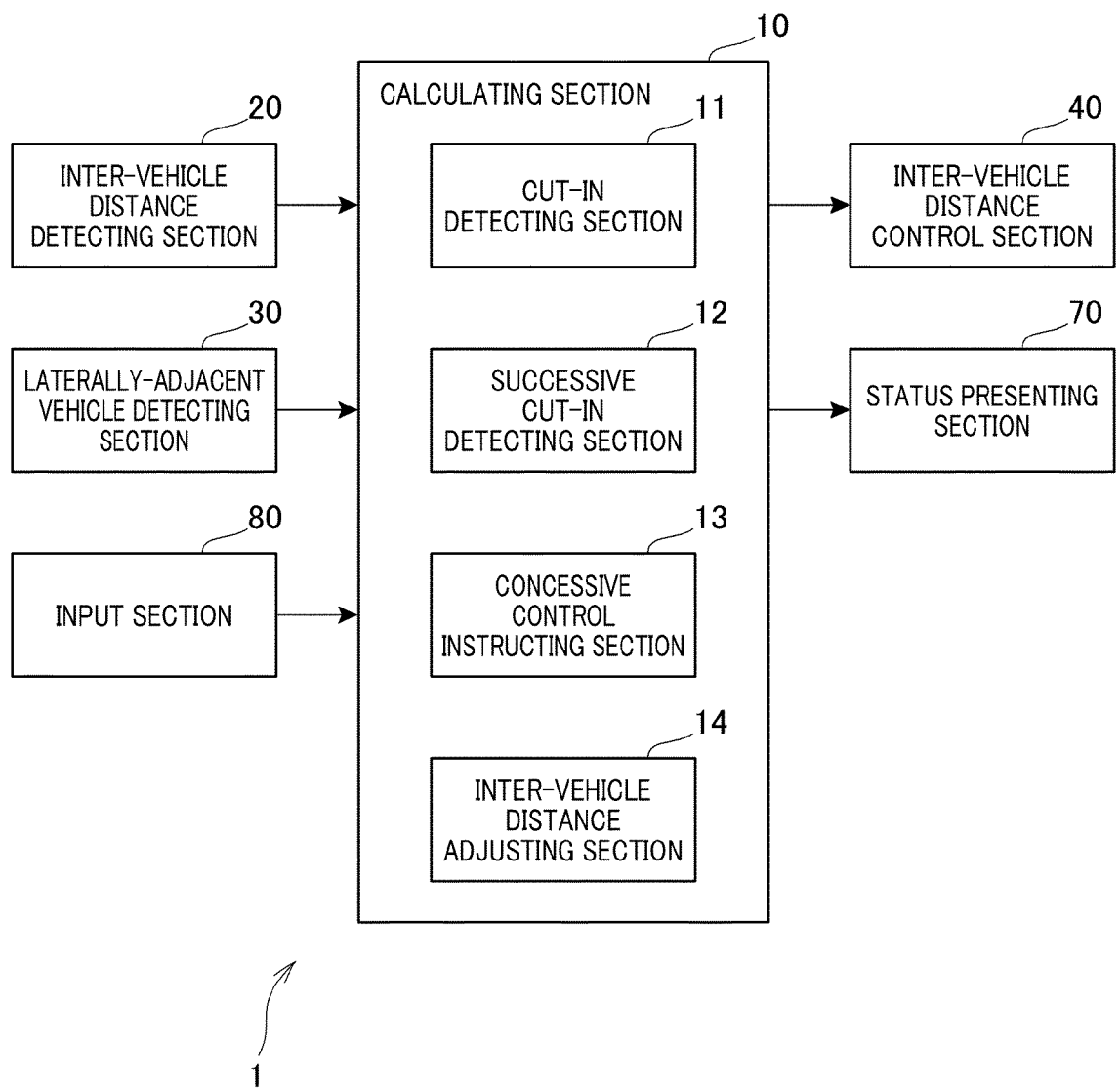
FIG. 20 is a block diagram of an overall configuration of an inter-vehicle distance control device according to a seventh embodiment.

As shown in FIG. 20, an inter-vehicle distance control device 1 according to a seventh embodiment is configured with the calculating section 10 as a main component, and the status presenting section 70 is connected to the calculating section 10, in a manner similar to the above-described inter-vehicle control device 6 according to the sixth embodiment. According to the seventh embodiment, an input section 80 is additionally connected to the calculating section 10. Components similar to those according to the above-described embodiments are given the same reference numbers. Descriptions thereof are omitted.

The input section 80 is used to confirm the intentions of the driver. For example, the input section 80 is realized as a press-button switch or a touch panel. The input section 80 is merely required to enable the intentions of the driver to be confirmed. For example, the input section 80 may be a voice recognition device.

Figure 21:
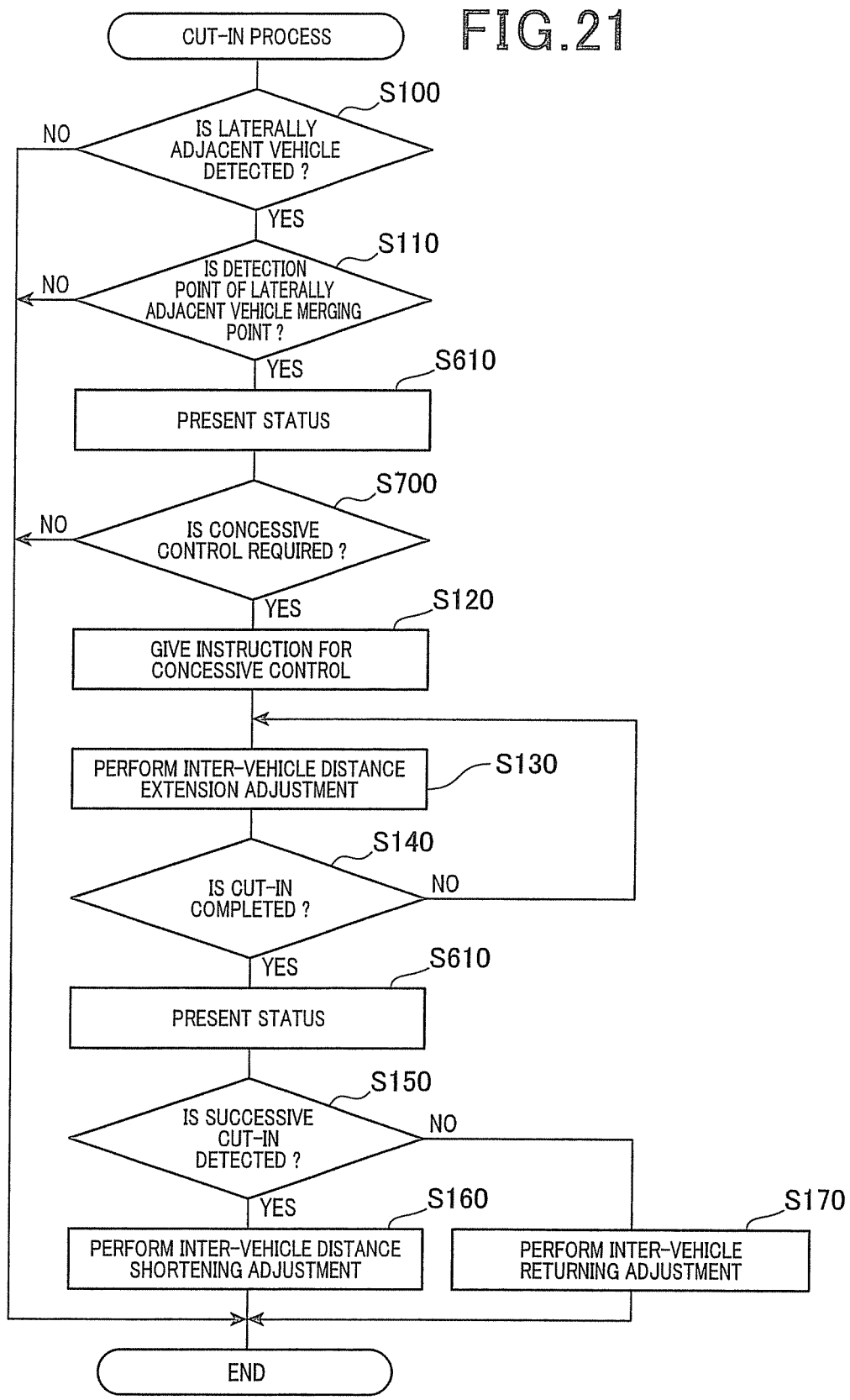
FIG. 21 is a flowchart of a cut-in process according to the seventh embodiment.

Next, the cut-in process performed by the calculating section 10 will be described based on the flowchart in FIG. 21. The cut-in process is repeatedly performed at a predetermined time interval by the calculating section 10.

Here, the cut-in process according to the seventh embodiment differs from that according to the sixth embodiment in that the calculating section 10 performs a control performance determination for determining whether or not the concessive control is required to be performed (S700 in FIG. 21), following the status presentation (S600). The determination is performed based on information from the input section 80. When determined that the concessive control is required to be performed (YES at S700), the calculating section 10 performs control similar to that according to the sixth embodiment. In other words, the input section 80 is included that is used to enable the driver to indicate whether or not to perform vehicle control, based on the status related to the vehicle control presented by the status presenting section 70.

In other words, the driver who is aware of the vehicle status as a result of the status presentation at S600 judges whether or not the concessive control is required to be performed, and indicates his intent via the input section 80. The driver can also intentionally cancel the concessive control. Confirmation of the intentions of the driver in this way may also be performed when a successive cut-in is detected (YES at S150). In other words, the driver can ultimately decide whether or not to perform the inter-vehicle distance shortening adjustment (S160) and the inter-vehicle returning adjustment (S170).

In the cut-in process such as that described above, the driver makes the final judgment regarding whether or not the inter-vehicle distance control is performed. Therefore, the inter-vehicle distance control is performed in more appropriate situations. In addition, effects similar to those according to the above-described embodiments are achieved in terms of the inter-vehicle distance extension adjustment (S130 in FIG. 21), the inter-vehicle distance shortening adjustment (S160) and the inter-vehicle distance returning adjustment (S170) being performed.

The present invention is not limited in any way by the above-described embodiments. Various embodiments are possible without departing from the technical scope of the invention. In addition, the above-described embodiments may be combined. For example, the configuration according to the second embodiment may be combined with the configurations according to the third to seventh embodiments. Specifically, the lateral position control section 50 may be connected to the calculating section 10 according to the third to seventh embodiments. The calculating section 10 may include the lateral position adjusting section 15. In this instance, the calculating section 10 performs the lateral position adjustment (S200 in FIG. 6) and the lateral position returning adjustment (S210) in a manner similar to those in the cut-in process according to the second embodiment. As a result, according to the third to seventh embodiments as well, an operation that is "concession" to the other vehicle attempting to cut in and an operation that is "moving away" from the other vehicle are performed when the likelihood of a cut-in is high. Therefore, situations in which the drivers of both the other vehicle and the own vehicle experience unease are further reduced.

What is claimed is:

1. An inter-vehicle distance control device, comprising:
an inter-vehicle distance detecting section for detecting an inter-vehicle distance between an own vehicle and a preceding vehicle traveling in front of the own vehicle;
a laterally adjacent vehicle detecting section for detecting an other vehicle present beside the own vehicle;
a cut-in detecting section for judging whether or not a cut-in by the other vehicle detected by the laterally adjacent vehicle detecting section is likely to occur, before the other vehicle cuts in between the own vehicle and the preceding vehicle;
an inter-vehicle distance adjusting section for performing inter-vehicle distance extension adjustment to increase the inter-vehicle distance when the cut-in detecting section judges that a cut-in is likely to occur;
an inter-vehicle distance control section for controlling the inter-vehicle distance based on information from the inter-vehicle distance adjusting section; and
a successive cut-in detecting section for judging whether or not a successive cut-in is likely to occur after the cut-in by the other vehicle is completed, based on the presence of a new vehicle detected by the laterally adjacent vehicle detecting section;
wherein the inter-vehicle distance adjusting section performs inter-vehicle distance shortening adjustment to reduce the inter-vehicle distance, when the successive cut-in detecting section judges that a successive cut-in is likely to occur.

2. The inter-vehicle distance control device according to claim 1, wherein the inter-vehicle distance adjusting section performs inter-vehicle distance returning adjustment to return the inter-vehicle distance to an inter-vehicle distance set in advance, when the successive cut-in detecting section detects that a successive cut-in is unlikely to occur.

3. The inter-vehicle distance control device according to claim 2, wherein the inter-vehicle distance control device further includes
a lateral position adjusting section for offsetting a lateral position to a direction away from the other vehicle, the lateral position being a traveling position of the own vehicle in a lateral direction within a cruising lane in which the own vehicle is traveling, when the lateral position can be adjusted and the cut-in detecting section judges that a cut-in is likely to occur; and
a lateral position control section for controlling the traveling position of the own vehicle based on information from the lateral position adjusting section.

4. The inter-vehicle distance control device according to claim 3, wherein the lateral position adjusting section performs a lateral position returning adjustment to return the lateral position to the original lateral position when the cut-in by the other vehicle is completed.

5. The inter-vehicle distance control device according to claim 4, wherein the cut-in detecting section judges that a cut-in is likely to occur when a point at which the other vehicle is detected by the laterally adjacent vehicle detecting section is a meeting point.

6. The inter-vehicle distance control device according to claim 5, wherein the inter-vehicle distance control device further includes a luminance change detecting section for detecting a change in luminance in an adjacent cruising lane adjacent to the cruising lane in which the own vehicle is traveling; and
a direction indication signal detecting section for judging whether or not a direction indicator of the other vehicle is blinking based on the change in luminance detected by the luminance change detecting section, wherein
the cut-in detecting section judges that a cut-in is likely to occur, when the direction indication signal detecting section judges that the direction indicator of the other vehicle is blinking.

7. The inter-vehicle distance control device according to claim 6, wherein the inter-vehicle distance control device further includes
a relative velocity detecting section for detecting a relative velocity of the other vehicle in relation to the own vehicle, based on results of a plurality of detection operations performed by the laterally adjacent vehicle detecting section, wherein
the cut-in detecting section judges that a cut-in is likely to occur, when the relative velocity detected by the relative velocity detecting section is greater than a threshold value set in advance.

8. The inter-vehicle distance control device according to claim 7, wherein
the laterally adjacent vehicle detecting section is capable of measuring a distance to the other vehicle; and
the cut-in detecting section judges that a cut-in is likely to occur, when the distance to the other vehicle is becoming shorter based on results of the plurality of detection operations performed by the laterally adjacent vehicle detecting section.

9. The inter-vehicle distance control device according to claim 8, wherein
a drift detecting section is included for judging whether or not the other vehicle is drifting, depending on whether or not fluctuation in the distance to the other vehicle is greater than a threshold value set in advance, based on results of a plurality of detection operations performed by the laterally adjacent vehicle detecting section; and
the cut-in detecting section judges that a cut-in is likely to occur, when the drift detecting section judges that the other vehicle is drifting.

10. The inter-vehicle distance control device according to claim 9, wherein the inter-vehicle distance control device further includes
a control status presenting section for presenting a driver with a status related to a vehicle control.

11. The inter-vehicle distance control device according to claim 10, wherein the inter-vehicle distance control device further includes
an input section for enabling the driver to indicate whether or not to perform the vehicle control based on the status related to the vehicle control presented by the control status presenting section.

12. The inter-vehicle distance control device according to claim 1, wherein the inter-vehicle distance control device further includes
a lateral position adjusting section for offsetting a lateral position to a direction away from the other vehicle, the lateral position being a traveling position of the own vehicle in a lateral direction within a cruising lane in which the own vehicle is traveling, when the lateral position can be adjusted and the cut-in detecting section judges that a cut-in is likely to occur; and a lateral position control section for controlling the traveling position of the own vehicle based on information from the lateral position adjusting section.

13. The inter-vehicle distance control device according to claim 12, wherein the lateral position adjusting section performs a lateral position returning adjustment to return the lateral position to the original lateral position when the cut-in by the other vehicle is completed.

14. The inter-vehicle distance control device according to claim 13, wherein the cut-in detecting section judges that a cut-in is likely to occur when a point at which the other vehicle is detected by the laterally adjacent vehicle detecting section is a meeting point.

15. The inter-vehicle distance control device according to claim 14, wherein the inter-vehicle distance control device further includes
 a luminance change detecting section for detecting a change in luminance in a cruising lane adjacent to the cruising lane in which the own vehicle is traveling; and
 a direction indication signal detecting section for judging whether or not a direction indicator of the other vehicle is blinking based on the change in luminance detected by the luminance change detecting section, wherein
 the cut-in detecting section judges that a cut-in is likely to occur, when the direction indication signal detecting section judges that the direction indicator of the other vehicle is blinking.

16. The inter-vehicle distance control device according to claim 1, wherein the inter-vehicle distance control device further includes
 a lateral position adjusting section for offsetting a lateral position to a direction away from the other vehicle, the lateral position being a traveling position of the own vehicle in a lateral direction within a cruising lane in which the own vehicle is traveling, when the lateral position can be adjusted and the cut-in detecting section judges that a cut-in is likely to occur; and
 a lateral position control section for controlling the traveling position of the own vehicle based on information from the lateral position adjusting section.

17. The inter-vehicle distance control device according to claim 16, wherein the lateral position adjusting section performs a lateral position returning adjustment to return the lateral position to the original lateral position when the cut-in by the other vehicle is completed.

18. The inter-vehicle distance control device according to claim 17, wherein the cut-in detecting section judges that a cut-in is likely to occur when a point at which the other vehicle is detected by the laterally adjacent vehicle detecting section is a meeting point.

19. The inter-vehicle distance control device according to claim 18, wherein the inter-vehicle distance control device further includes
 a luminance change detecting section for detecting a change in luminance in a cruising lane adjacent to the cruising lane in which the own vehicle is traveling; and
 a direction indication signal detecting section for judging whether or not a direction indicator of the other vehicle is blinking based on the change in luminance detected by the luminance change detecting section, wherein
 the cut-in detecting section judges that a cut-in is likely to occur, when the direction indication signal detecting section judges that the direction indicator of the other vehicle is blinking.

20. The inter-vehicle distance control device according to claim 1, wherein the successive cut-in detecting section judges whether or not a successive cut-in is likely to occur only after the cut-in by the other vehicle is completed.

21. The inter-vehicle distance control device according to claim 1, wherein the successive cut-in detecting section judges whether or not a successive cut-in is likely to occur immediately after the cut-in by the other vehicle is completed.

\* \* \* \* \*